US011410694B2

(12) United States Patent
Nguyen et al.

(10) Patent No.: US 11,410,694 B2
(45) Date of Patent: Aug. 9, 2022

(54) AXIAL FLUX PERMANENT MAGNET MOTOR FOR BALL SCREW CAM ELEVATOR MECHANISM FOR REDUCED-HEAD HARD DISK DRIVE

(71) Applicant: Western Digital Technologies, Inc., San Jose, CA (US)

(72) Inventors: Diep Nguyen, Castro Valley, CA (US); David K. Myers, Campbell, CA (US); Bikash Sukla, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 95 days.

(21) Appl. No.: 17/064,415

(22) Filed: Oct. 6, 2020

(65) Prior Publication Data

US 2021/0020194 A1 Jan. 21, 2021

Related U.S. Application Data

(63) Continuation-in-part of application No. 16/513,585, filed on Jul. 16, 2019, now Pat. No. 10,811,044.

(Continued)

(51) Int. Cl.
| | |
|---|---|
| *G11B 5/54* | (2006.01) |
| *G11B 5/48* | (2006.01) |
| *G11B 5/55* | (2006.01) |
| *H02K 7/14* | (2006.01) |
| *H02K 37/10* | (2006.01) |

(Continued)

(52) U.S. Cl.
CPC ....... *G11B 5/5569* (2013.01); *F16H 25/2204* (2013.01); *G11B 5/4813* (2013.01); *G11B 5/4873* (2013.01); *G11B 5/5573* (2013.01);

*H02K 7/14* (2013.01); *H02K 37/10* (2013.01); *F16H 2025/2081* (2013.01)

(58) Field of Classification Search
None
See application file for complete search history.

(56) References Cited

U.S. PATENT DOCUMENTS

| | | | |
|---|---|---|---|
| 3,134,097 A | 5/1964 | Stevens et al. | |
| 3,172,082 A | 3/1965 | Dirks | |

(Continued)

FOREIGN PATENT DOCUMENTS

| | | |
|---|---|---|
| CN | 1913303 A | 2/2007 |
| CN | 101083407 A | 12/2007 |

(Continued)

OTHER PUBLICATIONS

International Business Machines Corporation, IBM Customer Engineering Manual of Instruction, RAMAC 305, copyright 1958, 1959 by International Business Machines Corporation, 253 pages.

(Continued)

*Primary Examiner* — Jefferson A Evans
(74) *Attorney, Agent, or Firm* — John D. Henkhaus

(57) ABSTRACT

An approach to a reduced-head hard disk drive (HDD) involves an actuator elevator subsystem that includes a ball screw cam assembly with an axial flux permanent magnet (AFPM) motor affixed to a cam screw to drive rotation of the screw, which drives translation of an actuator arm assembly so that a corresponding pair of read-write heads can access different magnetic-recording disks of a multiple-disk stack.

19 Claims, 14 Drawing Sheets

Related U.S. Application Data

(60) Provisional application No. 62/700,777, filed on Jul. 19, 2018, provisional application No. 62/700,780, filed on Jul. 19, 2018, provisional application No. 62/702,163, filed on Jul. 23, 2018, provisional application No. 62/702,154, filed on Jul. 23, 2018, provisional application No. 62/747,623, filed on Oct. 18, 2018, provisional application No. 62/916,730, filed on Oct. 17, 2019.

(51) Int. Cl.
 *F16H 25/22* (2006.01)
 *F16H 25/20* (2006.01)

(56) References Cited

U.S. PATENT DOCUMENTS

| | | | |
|---|---|---|---|
| 3,505,060 A | 3/1970 | Goddard et al. | |
| 4,208,685 A * | 6/1980 | Matla | F16F 15/03 360/266.4 |
| 4,566,087 A | 1/1986 | Kraft | |
| 5,930,549 A | 7/1999 | Kim et al. | |
| 6,005,747 A | 12/1999 | Gilovich | |
| 7,986,491 B2 | 7/2011 | Albrecht et al. | |
| 8,112,580 B2 | 2/2012 | Bandic et al. | |
| 8,208,215 B2 | 6/2012 | Molaro et al. | |
| 8,824,094 B1 | 9/2014 | Furlong et al. | |
| 8,958,172 B1 | 2/2015 | Hansen | |
| 8,958,173 B1 | 2/2015 | Hirano et al. | |
| 9,025,277 B1 | 5/2015 | Hirano | |
| 9,183,862 B1 | 11/2015 | Shah et al. | |
| 9,218,833 B1 | 12/2015 | Shah et al. | |
| 9,552,835 B1 | 1/2017 | Tamayo et al. | |
| 9,704,521 B1 | 7/2017 | Shah et al. | |
| 10,250,098 B2 * | 4/2019 | Leiber | B60T 13/745 |
| 10,269,380 B1 | 4/2019 | Sun et al. | |
| 10,811,044 B2 * | 10/2020 | Myers | H02K 37/12 |
| 10,811,045 B2 * | 10/2020 | Mendonsa | G11B 5/5573 |
| 10,902,871 B2 * | 1/2021 | Myers | F16H 25/2204 |
| 10,916,271 B1 * | 2/2021 | Jacoby | G11B 21/22 |
| 10,930,307 B2 * | 2/2021 | Sukla | G11B 5/4813 |
| 10,978,100 B1 * | 4/2021 | Myers | G11B 5/4826 |
| 11,031,037 B1 * | 6/2021 | Garbarino | G11B 17/021 |
| 11,037,590 B2 * | 6/2021 | Nguyen | G11B 5/582 |
| 11,120,834 B1 * | 9/2021 | Herdendorf | G11B 5/54 |
| 11,176,963 B1 * | 11/2021 | Herdendorf | G11B 5/54 |
| 2004/0109255 A1 | 6/2004 | Walz | |
| 2008/0055773 A1 | 3/2008 | Nigam | |
| 2010/0091408 A1 * | 4/2010 | Albrecht | G11B 17/021 360/110 |
| 2010/0205623 A1 * | 8/2010 | Molaro | G11B 17/021 |
| 2011/0080675 A1 | 4/2011 | Boutaghou et al. | |
| 2013/0213163 A1 | 8/2013 | Nakamura et al. | |
| 2015/0070798 A1 | 3/2015 | Shiraishi et al. | |
| 2017/0108052 A1 | 4/2017 | Littlefield et al. | |
| 2019/0085957 A1 * | 3/2019 | Matsuto | F16H 25/2204 |
| 2019/0333533 A1 | 10/2019 | Mendonsa et al. | |
| 2020/0202891 A1 | 6/2020 | Mendonsa et al. | |

FOREIGN PATENT DOCUMENTS

| | | |
|---|---|---|
| CN | 103875163 A | 6/2014 |
| DE | 102007046382 A1 | 4/2009 |
| EP | 1538066 A1 | 6/2005 |
| EP | 1538066 B1 | 4/2009 |
| JP | 2005-346891 A | 12/2015 |
| WO | WO 2017/138353 A1 * | 8/2017 |

OTHER PUBLICATIONS

International Search Report and Written Opinion for PCT/US2019/042182, dated Feb. 7, 2020, 14 pages, KIPO ISA/KR.

International Search Report and Written Opinion for PCT/US2019/042202, dated Feb. 7, 2020, 13 pages, KIPO ISA/KR.

* cited by examiner

```
┌─────────────────────────────────────────────────────────────┐
│ DRIVE AN AXIAL FLUX PERMANENT MAGNET (AFPM) MOTOR AFFIXED TO A │
│   SCREW OF A BALL SCREW CAM ASSEMBLY, THEREBY ROTATING THE    │
│          SCREW ABOUT A COAXIAL FIXED SHAFT                    │
│                         1102                                  │
└─────────────────────────────────────────────────────────────┘
                              │
                              ▼
┌─────────────────────────────────────────────────────────────┐
│ ALLOW A PLANAR MULTI-BALL BEARING ASSEMBLY THAT IS COUPLED    │
│ WITH A HARD DISK DRIVE HEAD-STACK ASSEMBLY (HSA) TO TRANSLATE │
│    VERTICALLY IN RESPONSE TO ROTATING THE SCREW               │
│                         1104                                  │
└─────────────────────────────────────────────────────────────┘
                              │
                              ▼
┌─────────────────────────────────────────────────────────────┐
│ WHILE THE BEARING ASSEMBLY IS TRANSLATING, SENSE THE VERTICAL │
│                   POSITION OF THE HSA                         │
│                         1106                                  │
└─────────────────────────────────────────────────────────────┘
```

FIG. 11

AXIAL FLUX PERMANENT MAGNET MOTOR FOR BALL SCREW CAM ELEVATOR MECHANISM FOR REDUCED-HEAD HARD DISK DRIVE

CROSS-REFERENCE TO RELATED APPLICATIONS

This application is a continuation-in-part of and claims the benefit of priority to U.S. patent application Ser. No. 16/513,585, filed Jul. 16, 2019, which claims the benefit of priority to U.S. Provisional Patent Application No. 62/700,777, filed Jul. 19, 2018; to U.S. Provisional Patent Application No. 62/700,780, filed Jul. 19, 2018; to U.S. Provisional Patent Application No. 62/702,163, filed Jul. 23, 2018; to U.S. Provisional Patent Application No. 62/702,154, filed Jul. 23, 2018; and to U.S. Provisional Patent Application Ser. No. 62/747,623, filed Oct. 18, 2018; the entire content of all of which is incorporated by reference for all purposes as if fully set forth herein.

This application claims the benefit of priority to U.S. Provisional Patent Application No. 62/916,730, filed Oct. 17, 2019; the entire content of which is incorporated by reference for all purposes as if fully set forth herein.

FIELD OF EMBODIMENTS

Embodiments of the invention may relate generally to a reduced-head hard disk drive having an actuator elevator mechanism and particularly to approaches to driving a low-profile ball screw cam actuator elevator mechanism.

BACKGROUND

There is an increasing need for archival storage. Tape is a traditional solution for data back-up, but is very slow to access data. Current archives are increasingly "active" archives, meaning some level of continuing random read data access is required. Traditional hard disk drives (HDDs) can be used but cost may be considered undesirably high. Other approaches considered may include HDDs with extra large diameter disks and HDDs having an extra tall form factor, with both requiring large capital investment due to unique components and assembly processes, low value proposition in the context of cost savings, and barriers to adoption in the marketplace due to uniquely large form factors, for example.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 11 is a flow diagram illustrating a method for vertically translating a head-stack assembly (HSA) in a hard disk drive (HDD) to access multiple magnetic-recording disks, according to an embodiment.

DESCRIPTION

Approaches to a multi-disk hard disk drive having an actuator elevator mechanism are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a multi-disk, reduced read-write head, digital data storage device (DSD) such as a hard disk drive (HDD). Thus, in accordance with an embodiment, a plan view illustrating a conventional HDD 100 is shown in FIG. 1 to aid in describing how a conventional HDD typically operates.

Figure 1:
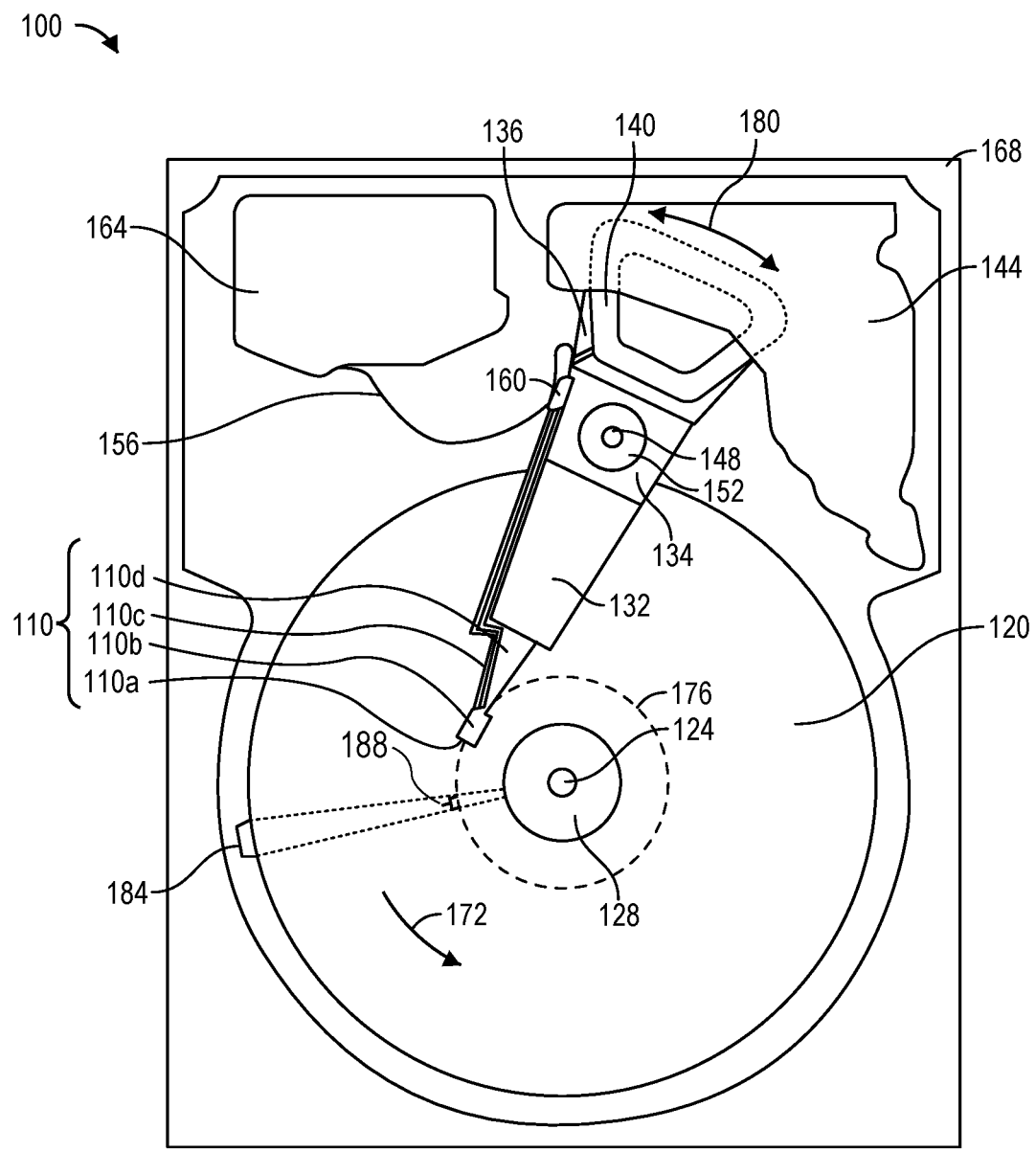
FIG. 1 is a plan view illustrating a hard disk drive, according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

References herein to "an embodiment", "one embodiment", and the like, are intended to mean that the particular feature, structure, or characteristic being described is included in at least one embodiment of the invention. However, instance of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

While terms such as "optimal", "optimize", "minimal", "minimize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Recall that there is an increasing need for cost effective "active" archival storage (also referred to as "cold storage"), preferably having a conventional form factor and utilizing many standard components. One approach involves a standard HDD form factor (e.g., a 3.5" form factor) and largely common HDD architecture, with a non-zero finite number of n disks in one rotating disk stack, but containing fewer than 2n read-write heads, according to embodiments. Such a storage device may utilize an articulation mechanism that can move the heads to mate with the different disk surfaces (for a non-limiting example, only 2 heads but 5+ disks for an air drive or 8+ disks for a He drive), where the primary cost savings may come from eliminating the vast majority of the heads in the drive.

For a cold storage data storage device, a very thin structure (e.g., the read-write head stack assembly, or "HSA") needs to be moved while keeping perpendicular to the axis on which it is moving. That structure also needs to maintain sufficient stiffness for structural and resonance control. There may be ball screws on the market that may comply with such requirements, but they are taller than the shaft they ride on and are typically considerably expensive.

With other possible approaches, there is a concern that when the actuator arms are unlocked during the time they need to be moved up and down to get to different disks, the interface between the arms and the cam rattles or is relatively loose. This could cause undesirable motion in the suspensions and heads as the arms are raised and lowered. There is also a large range of potential friction between the cam threads, arm threads, and lock nut threads that could over time cause extra wear and bad repeatability in the vertical positioning achieved.

Actuator Subsystem for Reduced-Head Hard Disk Drive

Figure 2A:
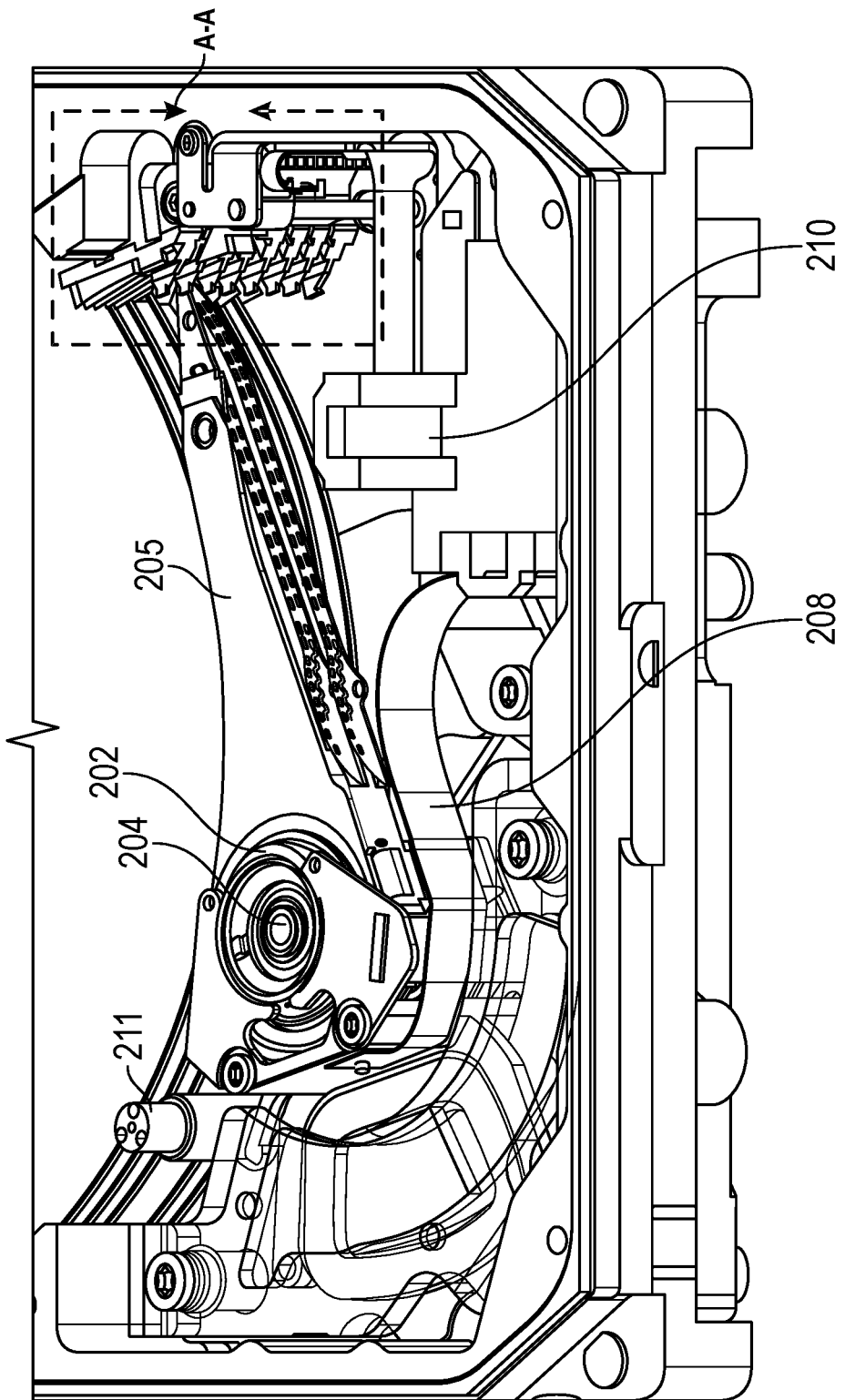
FIG. 2A is a perspective view illustrating an actuator subsystem in a reduced-head hard disk drive, according to an embodiment.
Figure 2B:
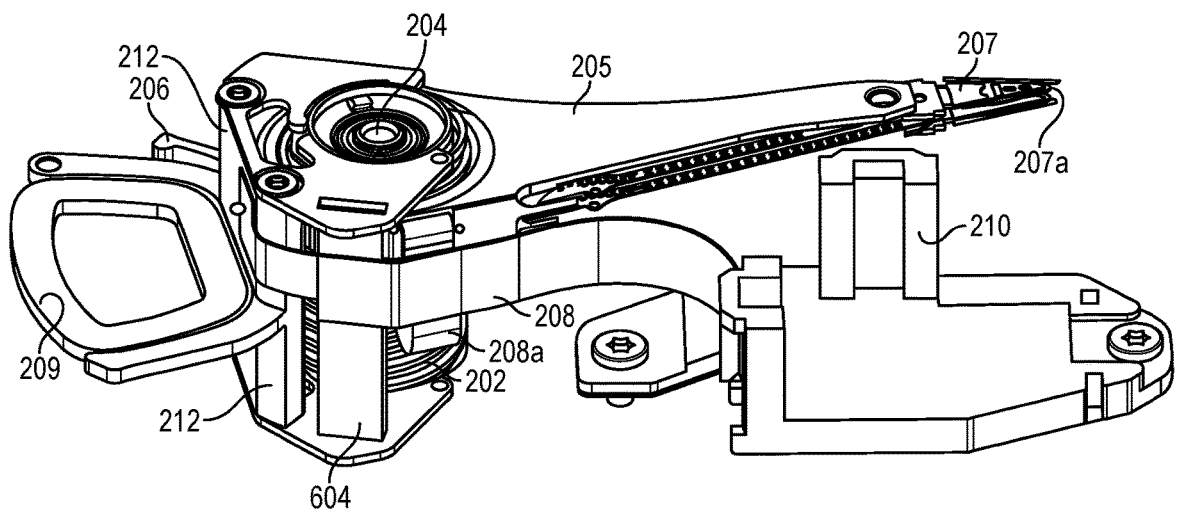
FIG. 2B is an isolated perspective view illustrating the actuator subsystem of FIG. 2A, according to an embodiment.
Figure 2C:
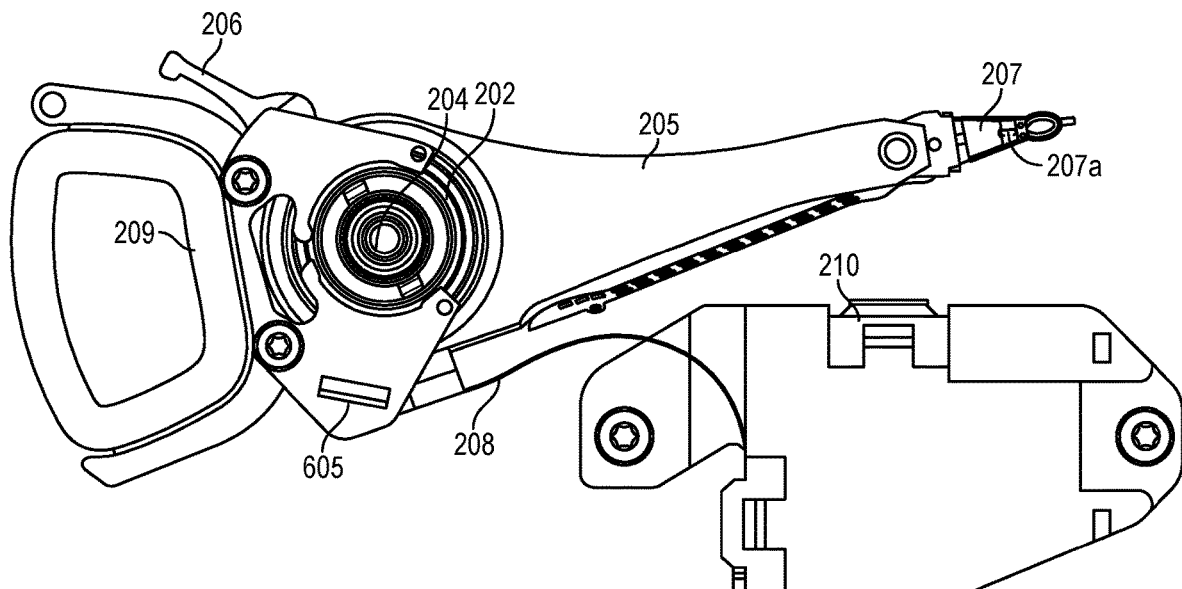
FIG. 2C is an isolated plan view illustrating the actuator subsystem of FIG. 2A, according to an embodiment.

FIG. 2A is a perspective view illustrating an actuator subsystem in a reduced-head hard disk drive (HDD), FIG. 2B is an isolated perspective view illustrating the actuator subsystem of FIG. 2A, and FIG. 2C is an isolated plan view illustrating the actuator subsystem of FIG. 2A, all according to embodiments. FIGS. 2A-2C collectively illustrate an actuator subsystem comprising a low profile ball screw cam assembly 202 (or "cam 202"), which transforms rotary motion into linear motion, with a stepper motor 204 (or "stepping motor") disposed therein to form an actuator elevator subassembly, which is disposed within the actuator pivot and pivot bearing of the actuator subsystem (e.g., the "pivot cartridge") and is configured to vertically translate at least one actuator arm 205 (see, e.g., arm 132 of FIG. 1) along with a respective HGA 207 (see, e.g., HGA 110 of FIG. 1). According to an embodiment, the actuator subsystem for a reduced-head HDD consists of two actuator arm 205 assemblies each with a corresponding HGA 207 (e.g., a modified HSA, in which the actuator arm assemblies translate vertically, or elevate, while the VCM coil 209 may be fixed in the vertical direction) housing a corresponding read-write head 207a (see, e.g., read-write head 110a of FIG. 1). Generally, the term "reduced-head HDD" is used to refer to an HDD in which the number of read-write heads is less than the number of magnetic-recording disk media surfaces.

With respect to electrical signal transmission, FIGS. 2A-2C further illustrate a flexible cable assembly 208 ("FCA 208"), which is configured to comprise a dynamic vertical "loop" 208a ("FCA vertical loop 208a") for vertical translation of the end(s) that are coupled to the actuator elevator subassembly and/or another portion of the actuator subsystem. This FCA vertical loop 208a is in addition to a typical dynamic horizontal loop for horizontal translation purposes for when the actuator to which one end is connected is rotating. The actuator subsystem further comprises at least one connector housing 210 for housing an electrical connector for transferring electrical signals (e.g., motor power, sensor signals, etc.) between the actuator elevator subassembly and a ramp elevator assembly (described in more detail elsewhere herein).

With respect to actuator arm locking, FIGS. 2A-2C further illustrate an arm lock subsystem 206, coupled with or constituent to a coil support assembly 212, configured to mechanically interact with an outer diameter crash stop 211 ("ODCS 211") to lock and unlock the actuator elevator subassembly, as described in more detail elsewhere herein.

Actuator Elevator Assembly

Figure 3:
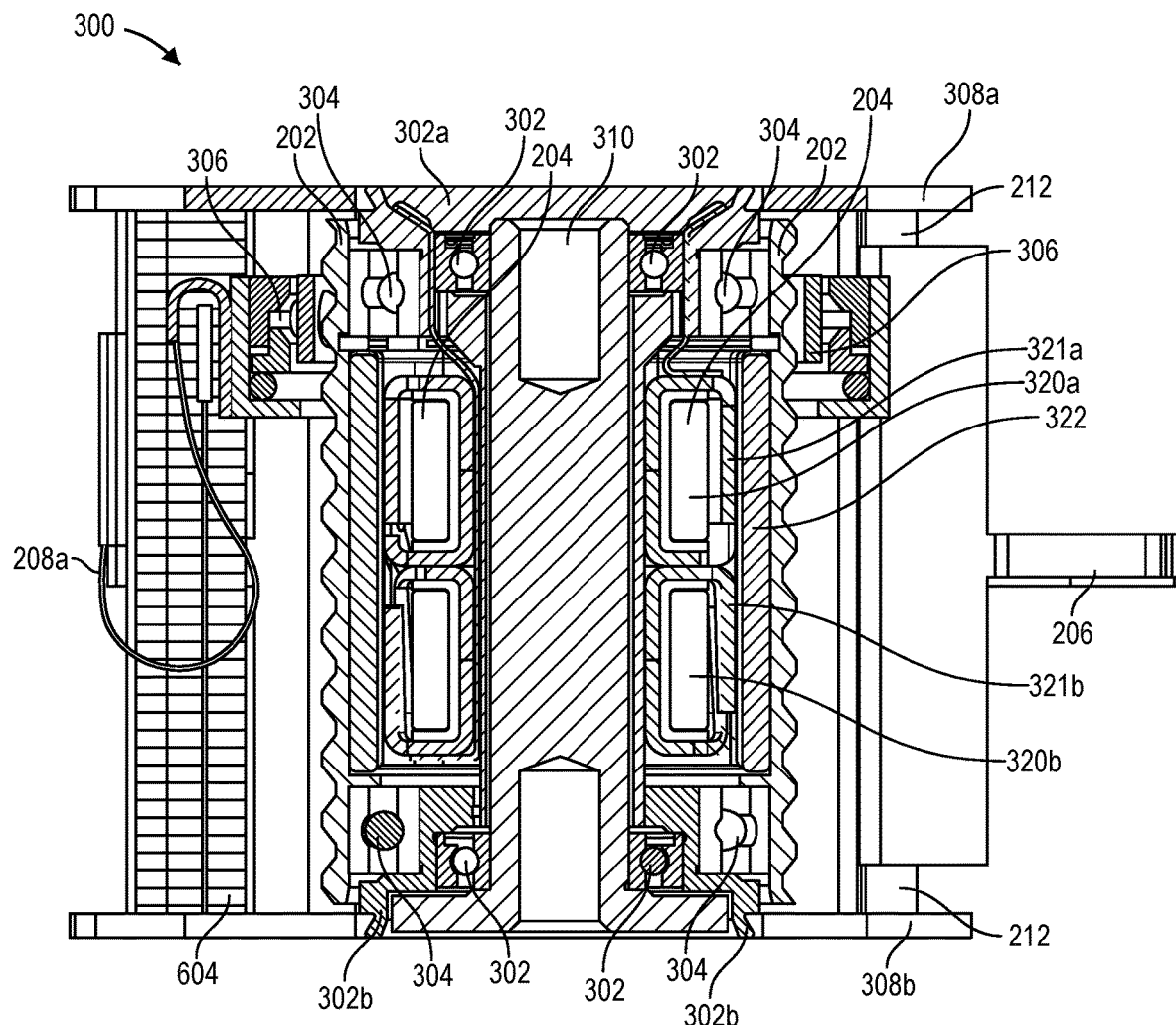
FIG. 3 is a cross-sectional side view illustrating an actuator elevator assembly, according to an embodiment.

FIG. 3 is a cross-sectional side view illustrating an actuator elevator assembly, according to an embodiment. The actuator elevator assembly 300 illustrated in FIG. 3 is configured for use in an actuator subsystem as illustrated and described in reference to FIGS. 2A-2C, i.e., configured to vertically translate at least one actuator arm 205 (shown here is a portion of the arm 205 that engages with the pivot; see, e.g., FIGS. 2A-2C, 4A-4C) with a respective HGA 207 (FIGS. 2B, 2C) and read-write head 207a (FIGS. 2B, 2C).

Actuator elevator assembly 300 comprises the actuator elevator subassembly comprising the ball screw cam 202, having the stepper motor 204 coupled to (e.g., with an outer sleeve adhered to the inner surface of the cam 202) and disposed therein and interposed between the cam 202 and a pivot shaft 310, where the pivot shaft 310 bottom is shown positioned within an opening of a bottom support plate 308b and the pivot shaft 310 top is shown positioned approaching or within an opening of a top support plate 308a. In a typical HDD configuration, the inner pivot shaft 310 is further coupled to an HDD enclosure base (see, e.g., housing 168 of FIG. 1) via a screw or other fastener and to an HDD cover (not shown) via another screw or fastener, effectively sandwiching the pivot shaft 310 and the actuator elevator assembly 300 more broadly within the corresponding HDD.

Actuator elevator assembly 300 further comprises a first set or pair of HSA pivot bearings 302 (along with upper inner bearing housing 302a and lower inner bearing housing 302b) interposed between the pivot shaft 310 and the stepper motor 204 (e.g., one bearing assembly near the top and one bearing assembly near the bottom). HSA pivot bearings 302 function to support loads associated at least in part with the rotation of the actuator arms 205 (FIGS. 2A-2C), along with the stepper motor 204 and the cam 202 to which it is attached, about the stationary pivot shaft 310, such as during actuator seek/read/write/load/unload operations. Actuator elevator assembly 300 further comprises a second set or pair of cam bearings 304 interposed between the stepper motor 204 and the cam 202 (e.g., one bearing assembly near the top and one bearing assembly near the bottom). Cam bearings 304 function to support loads associated at least in part with the rotation of the stepper motor 204 and the cam 202 about the stationary pivot shaft 310 (when the actuator elevator subassembly is decoupled from the HSA pivot inner bearing housing 302a, 302b, as described in more detail elsewhere herein with respect to the operation of the arm lock subsystem 206), such as during actuator vertical translation operations.

Actuator elevator assembly 300 further comprises a third set of ball screw bearings comprising balls 202c and retainer 202b interposed between a cam screw 202a (see, e.g., FIGS. 4A-4C) and the actuator arm 205. This ball screw bearing assembly functions to support loads associated at least in part with the rotation of the stepper motor 204 and the cam 202 about the stationary pivot shaft 310 and the consequent actuator vertical translation operations.

Low Profile Ball Screw Cam

According to an embodiment, one approach to an actuator elevator mechanism for a cold storage HDD uses a multi-start threaded shaft (also referred to as a "multi-start ball screw") with a ball in each start to create a plane perpendicular to the screw/cam. The balls are held equally spaced around the shaft by a bearing retainer. The balls are preloaded to the shaft at all times by compressing the two outer races. This platform is stable and does not rattle or function loosely, thus providing consistent structural integrity.

Figure 4A:
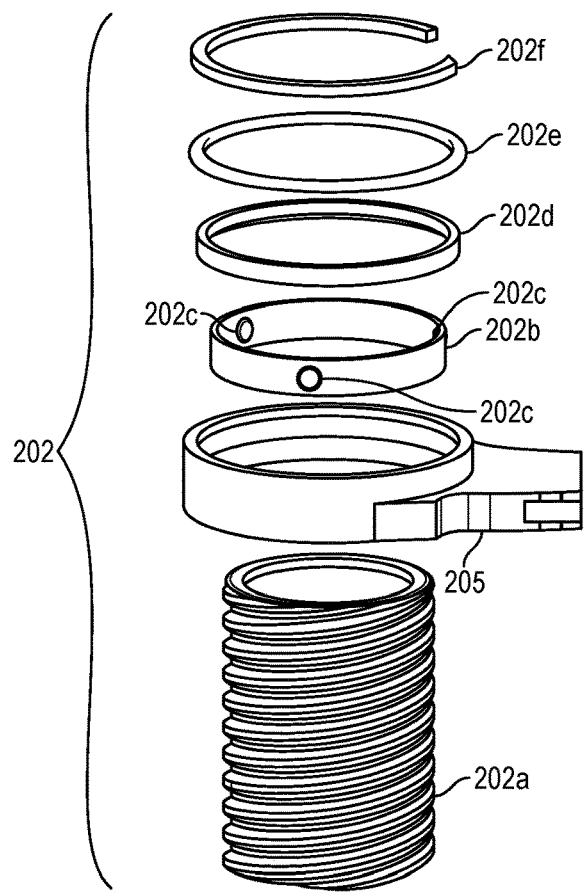
FIG. 4A is an exploded view illustrating a low-profile ball screw cam assembly, according to an embodiment.
Figure 4B:
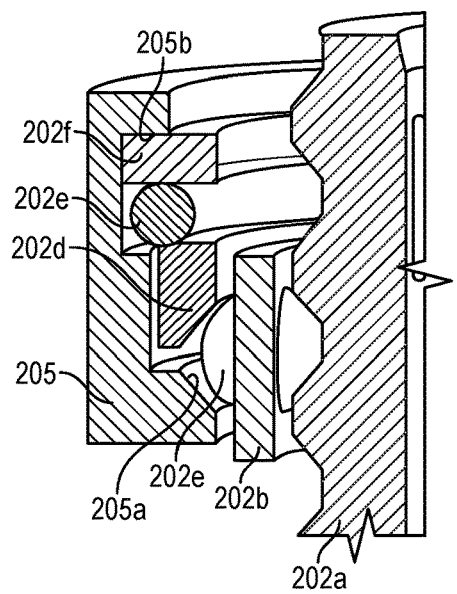
FIG. 4B is a partial cross-sectional view illustrating a portion of the cam assembly of FIG. 4A, according to an embodiment.

FIG. 4A is an exploded view illustrating a low-profile ball screw cam assembly, and FIG. 4B is a partial cross-sectional view illustrating a portion of the cam assembly of FIG. 4A, according to an embodiment. The illustrated ball screw cam assembly referred to as cam 202 comprises the hollow threaded shaft or screw 202a, a bearing retainer 202b or retaining ring with a plurality of equally-spaced retained balls 202c, a bearing half-race 202d, an O-ring 202e, and, optionally, a C-clip 202f, according to an embodiment. Cam 202 is configured for use in the actuator elevator assembly 300 illustrated in FIG. 3, which is configured for use in the actuator subsystem illustrated and described in reference to FIGS. 2A-2C, i.e., to vertically translate at least one actuator arm 205 with a respective HGA 207 and read-write head 207a. However, use of a cam mechanism such as cam 202 in implementations outside of such an actuator subsystem (e.g., in a camera, or in other products requiring a miniature cam/translation mechanism) is contemplated, so the use scenarios for cam 202 are not limited to implementations only within such an actuator subsystem.

It is noteworthy that with cam 202, according to an embodiment, the number of starts equals the number of balls, thereby providing a stable planar "platform" with a single bearing assembly and perpendicular to the axis/translation path. According to an embodiment, three balls 202c are held within the bearing retainer 202b, thereby providing a 3-point planar bearing assembly while facilitating the low-profile aspect of the cam 202. While three balls are needed to define or construct the plane, the number of balls 202c may vary from implementation to implementation. While greater than three balls 202c provides a more stable planar platform (e.g., more contact points about the shaft provides more actuator arm stiffness and stability), a greater number of balls 202c would also increase the thread pitch and lead corresponding to the screw thread (especially in view of a stepper motor driver), perhaps undesirably in some use scenarios.

With reference to FIG. 4B, one can see that the tapered starts/threads of screw 202a function as upper and lower portions of an inner race of the bearing assembly of cam 202. According to an embodiment, the outer race of the bearing assembly of cam 202 is a split-race, i.e., a 2-part race (whereby the two outer load surfaces are split among two parts), comprising a tapered inner surface 205a of the opening in arm 205 as a lower outer race surface, and a tapered lower surface of bearing half-race 202d as an upper outer race surface, together forming what may be referred to as a v-notch outer race. The bearing assembly is therefore preloaded radially at four points of contact via the inner and outer races, while the O-ring 202e (e.g., elastomeric) functions as a spring to provide a variable compression force applied to the bearing half-race 202d, in conjunction with the C-clip 202f. Alternatively to use of an elastomeric O-ring 202e (e.g., which can degrade and cause creep over time), according to an embodiment a wavy washer, functioning as a metallic spring, may be implemented to provide the compression force to the outer race. Hence, this arrangement functions to manage or compensate for the possibility of slight changes in the diameter of the inner race/threads at various locations along the length of the screw 202a, such as those associated with part tolerances and manufacturing variability.

Figure 4C:
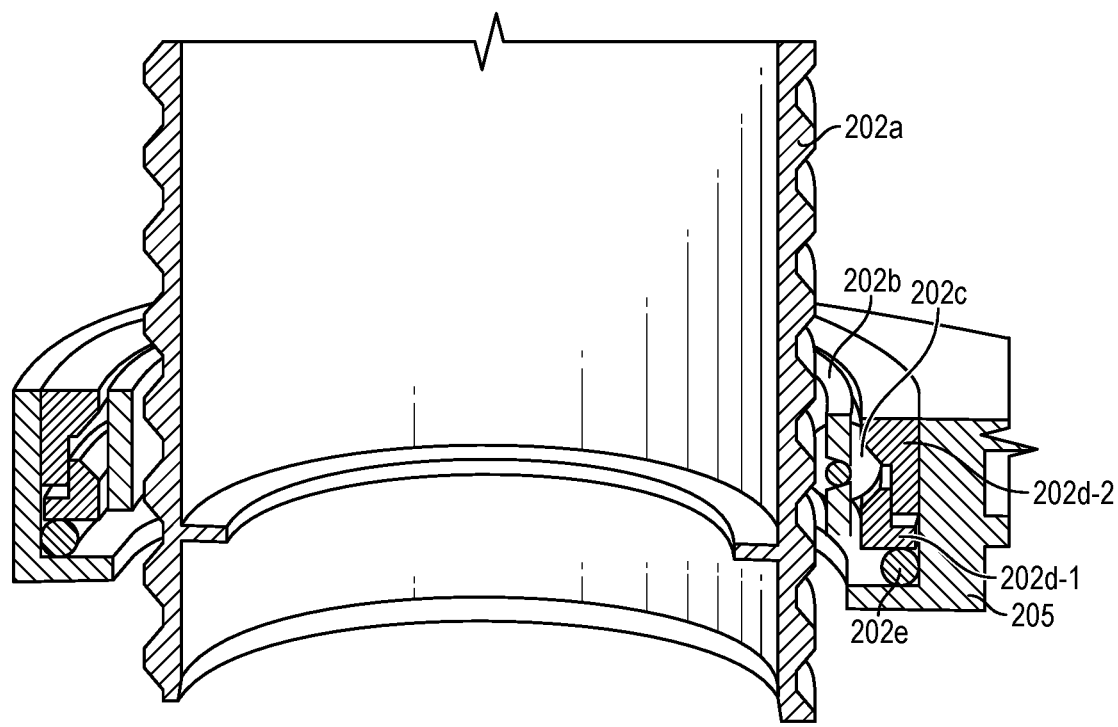
FIG. 4C is a partial cross-sectional view illustrating a portion of an alternative cam assembly, according to an embodiment.

Furthermore, one could eliminate use of the C-clip 202f and reconfigure the outer race, as illustrated in FIG. 4C. FIG. 4C is a partial cross-sectional view illustrating a portion of an alternative cam assembly, according to an embodiment. As with the embodiment illustrated in FIG. 4B, the tapered starts/threads of screw 202a function as upper and lower portions of an inner race of the bearing assembly of this embodiment of ball screw cam, cam 203. Here also the outer race of the bearing assembly of cam 203 is a split-race, or 2-part race, comprising a tapered half-race 202d-1 as a lower outer race surface and a tapered half-race 202d-2 as an upper outer race surface (bonded to an inner surface of the opening in arm 205 after preloading), together forming what may be referred to as a v-notch outer race. Here also the bearing assembly is therefore preloaded radially at four points of contact via the inner and outer races, while the O-ring 202e (or wavy washer) functions as a spring to provide a variable compression force applied to the bearing split-race comprising 202d-1, 201d-2.

In-Pivot Claw-Pole Stepper Motor

In the context of a cold storage HDD that includes a rotary cam (e.g., cam 202) that is rotated with respect to the coil assembly (e.g., VCM coil 209), which would vertically move the actuator arms 205 up and down from disk to disk, a means to provide that rotation is needed. According to an embodiment and with reference to FIGS. 2A-3, a stepper motor 204 is assembled within the pivot (or, the pivot cartridge) of the actuator subsystem (FIGS. 2A-2C), which, in conjunction with the cam 202 (FIGS. 4A-4B), forms an actuator elevator assembly 300 (FIG. 3).

So-called "claw-pole" designs contain an inner permanent magnet (PM) mounted on a rotary lead-screw shaft. In the context of a multi-disk HDD having an actuator elevator mechanism, the actuator subsystem design comprises a stationary shaft during the translation of the head stack assembly (HSA) to switch between magnetic recording disks. With this, a unique design of a claw-pole stepper motor is needed. The smaller magnet volume of a typical claw-pole motor where the stator circumscribes the PM requires a high number of turns (100 or more) with a very small copper wire (e.g. 0.05 millimeter (mm)) due to the physical limitations. Because electromagnetic torque, $T_e = kD^2L$, is proportional to the square of the diameter of the magnetic air gap and the stator stack length, it is advantageous to maximize the motor diameter.

However, winding with a smaller wire diameter is difficult due to its fragility and is more susceptible to the fluctuation of the winding tension that causes wider distribution of the winding resistance. A high number of turns with a small diameter wire results in a higher copper loss, $P_{copper\ loss} = i^2 R$, and subsequent heat that may adversely affect the internal environment of the HDD in terms of the dynamic read-write head gap due to potential ball-bearing oil migration. Thus, in the confined space of the cold storage data storage device rotary cam, it is preferable to implement a compact stepper motor to rotate the cam in order to move the HSA bi-directionally in the vertical direction to access different disks in the stack.

A claw-pole motor such as stepper motor 204 comprises, for example, two uni-filar windings in injection-molded-plastic spools for bipolar control and four claw-pole stators made from cold-rolled steel sheet metal, electrical steel sheet metal, SMC (Soft Magnetic Composite), and the like, where use of electrical steel with various levels of silicon content or SMC reduces the eddy current loss. Furthermore, use of SMC can produce a complex geometry through powder metallurgy, unlike stamped and formed electrical steel sheet. Each stator contains p/2 teeth (p=number of poles) (e.g., 5 teeth per claw-pole stator according to an embodiment of stepper motor 204 having a 10-pole PM). The step angle of a stepper motor depends on the number of poles and stator teeth. In a design having 10 poles and 20 teeth, suitable for the intended purpose, the step angle/rotation is 18° or 20 steps/revolution in a full-step control, with both stator assemblies having a pair of claw-pole stators shifted relative to the other by one-half pole width, and where the step angle is inversely proportional to the number of stator teeth. Likewise, a design with 100 teeth yields 360°/100 or 3.6°/step angle, for example. In the case of 4 start-threaded rotary cam, this 3.6° step angle would provide 4 mm/100 steps or 0.04 mm step resolution rather than 4 mm/20 steps or 0.2 mm step resolution, thus providing a more precise and accurate servo control for positioning the HSA between the disks. Stated otherwise, a higher number of the claw (stator) teeth provides for a smaller step resolution. However, the outer diameter (OD) of the system (e.g., cam 202) limits the possible number of claw teeth. That is, with a given OD there is a practical limit to the number of teeth implemented because adding more teeth reduces their size and leads to manufacturing difficulty, magnetic saturation, and unstable tooth structures. For example, with an 18 mm OD, the system could be limited to 40 teeth and a step angle of 360°/40 or 9°. To get a higher step resolution, a micro-step may be used, where a typical bi-polar driver provides ½, ¼, ⅛, ¹⁄₁₆, and ¹⁄₃₂ micro-steps.

A corresponding rotor of stepper motor 204 comprises a PM (e.g. Nd—Fe—B) attached to the inner diameter of the cam 202 (see, e.g., FIG. 3), which, according to an embodiment, is constructed of ferritic stainless steel, and where the PM comprises 10 hetero-polar magnets. Hence, when the coils are energized the teeth become north and south poles, and mutual torque is established when the north PM poles align with the south claw poles and the south PM poles align with the north claw poles. Reversing the current polarity in the stator coils reverses the polarity of the electromagnetic claw poles and the resultant torque advances the rotor one full step.

Note that the number of coils and corresponding claw-pole stator pairs (i.e., phases), and the number of corresponding teeth on each claw-pole stator, may vary from implementation to implementation based on specific design goals (e.g., torque, phases and rotational degrees/step or steps/revolution) and, therefore, are not limited by the number described in the foregoing example. For example, with a 2-inch form-factor HDD, a four-coil design is feasible, which equates to 9° step angle, i.e., 360°/(number of teeth per claw)*(number of claws)=360°/(4*10)=9°/step. Alternatively, the step angle can be computed from the corresponding number of rotor poles and phases, i.e., 360°/(2 phases*20 rotor poles)=9°/step.

With reference back to FIG. 3, stepper motor 204 comprises a circular "phase A" coil 320a (with or without corresponding bobbin) enveloped by a pair of corresponding circular and mating claw-poles stators 321a, a circular "phase B" coil 320b (with or without corresponding bobbin) enveloped by a pair of corresponding circular and mating claw-pole stators 321b, disposed within a circular permanent magnet 322 ("PM 322"), all positioned around the stationary shaft 310. Note that when the HSA moves (e.g., actuator arm 205 seeks), the cam 202 and the HSA pivot bearing 302 upper and lower housing 302a, 302b move synchronously and thus eliminate the differential reluctance or cogging torque that must be overcome in the rotary motion of the HSA.

According to an embodiment, it is noteworthy that in-pivot stepper motor 204 is configured with an outer rotor and inner stators. That is, in contrast with typical stepper motors, here the PM 322 is on the outside of the stepper motor 204 assembly and the claw-poles 321a, 321b and coils 320a, 320b are on the inside of the PM 322. Likewise, while a conventional stepper motor typically rotates a central shaft, here the shaft 310 is fixed/stationary and the PM 322 rotor is bonded to the inner diameter of the cam shaft or screw 202a such that the stepper motor 204 rotates the outer cam 202 about the fixed inner shaft 310. In that sense, this embodiment of stepper motor 204 is akin to a conventional stepper motor that is "turned inside-out".

Method of Assembling an Actuator Elevator Subassembly

A method of assembling an actuator elevator subassembly, according to an embodiment, is as follows. The described method may be used to assemble an assembly comprising the cam 202 and a 10-pole stepper motor such as in-pivot stepper motor 204, for example. However, as described elsewhere herein, the number of poles may vary from implementation to implementation and therefore, is not so limited.

First, insert the upper HSA pivot bearing 302 into the upper inner bearing housing 302a and bond (e.g., glue) the outer race of the upper HSA pivot bearing 302 to the upper inner bearing housing 302a. Next, insert the upper cam bearing 304 around the inner bearing housing 302a and bond the inner race of the upper cam bearing 304 to the upper inner bearing housing 302a. Once these bearings 302, 304 are assembled, the method moves on to the stepper motor 204, as follows.

Insert around, orient, and bond a claw-pole stator 321a (a first half of a first pair) to an outer sleeve portion of the upper inner bearing housing 302a. Next, insert within and bond a first coil 320a to the first claw-pole stator 321a of the first pair. Next, rotate a claw-pole stator 321a (the second half of the first pair) 36° relative to the first claw-pole stator 321a of the first pair and bond the second half of the claw-pole stator 321a to the outer sleeve portion of the upper inner bearing housing 302a. Next, rotate a claw-pole stator 321b (a first half of a second pair) 18° relative to the second claw-pole stator 321a of the first pair and bond the first half of the claw-pole stator 321b of the second pair to the outer sleeve portion of the upper inner bearing housing 302a. Next, insert around and bond a second coil 320b to the upper inner bearing housing 302a. Next, rotate a claw-pole stator 321b (the second half of the second pair) 36° relative to the first claw-pole stator 321b of the second pair and bond the second half of the claw-pole stator 321b to the outer sleeve portion of the upper inner bearing housing 302a. Insert a magnetized PM 322 (magnetized to produce 10 pole, or 5 pole-pairs) and bond the outer diameter surface of the PM 322 to in the inner diameter surface of the screw 202a. Once the stepper motor is assembled as above, the method moves on to the lower bearings, as follows.

Insert the lower HSA pivot bearing 302 into the lower inner bearing housing 302b and bond the outer race of the lower HSA pivot bearing 302 to the lower inner bearing housing 302b. Next, insert the lower cam bearing 304 around the lower inner bearing housing 302b and bond the inner race of the lower cam bearing 304 to the lower inner bearing housing 302b. Next, bond the outer race of the lower cam bearing 304, now in assembly form with the lower HSA pivot bearing 302 and the lower inner bearing housing 302b, into the screw 202a subassembly. Next, apply bonding adhesive completely around the outer diameter periphery of the upper inner bearing housing 302a, and apply bonding adhesive to the outer race of the upper cam bearing 304, and insert this subassembly into the screw 202a subassembly. Next, apply an adhesive bead to the lower inner bearing housing 302b and insert that lower bearing assembly into the screw 202a subassembly and the upper bearing subassembly. Finally, heat-cure the thermoset adhesive by placement of the assembly in an oven, for example.

Locking/Unlocking Mechanism for Vertically Translatable Actuator Assembly

Figure 5A:
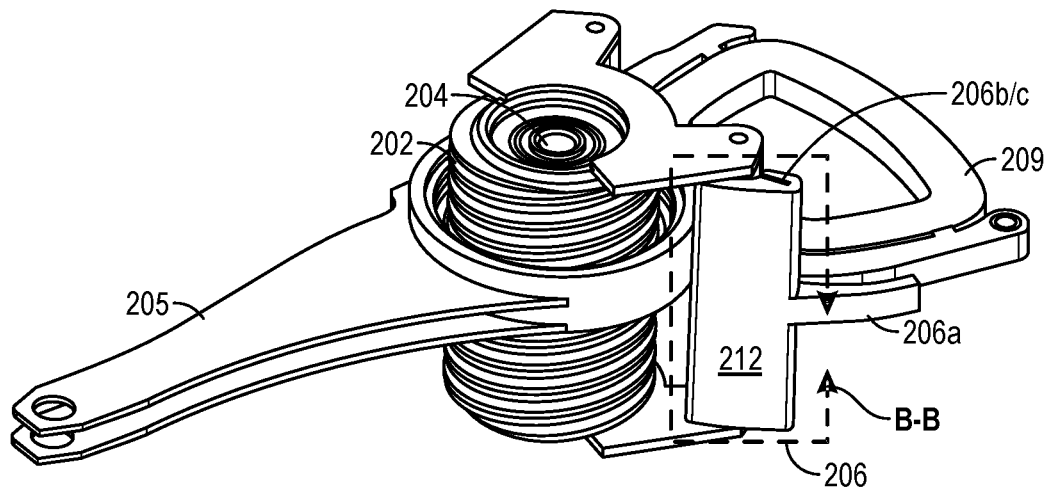
FIG. 5A is a perspective view illustrating an actuator-elevator assembly, according to an embodiment.
Figure 5B:
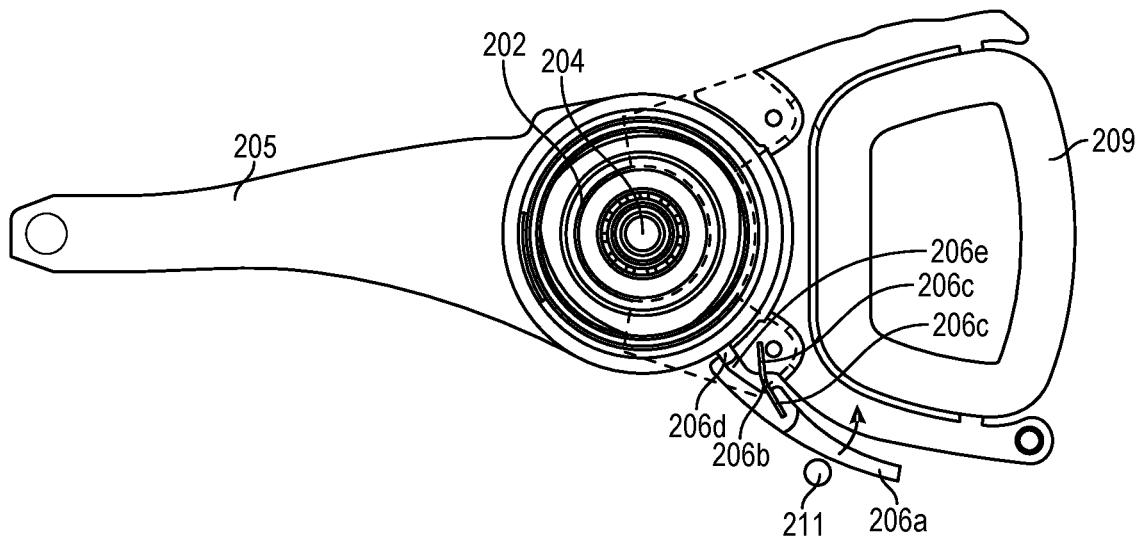
FIG. 5B is a plan view illustrating the actuator-elevator assembly of FIG. 5A, according to an embodiment.
Figure 5C:
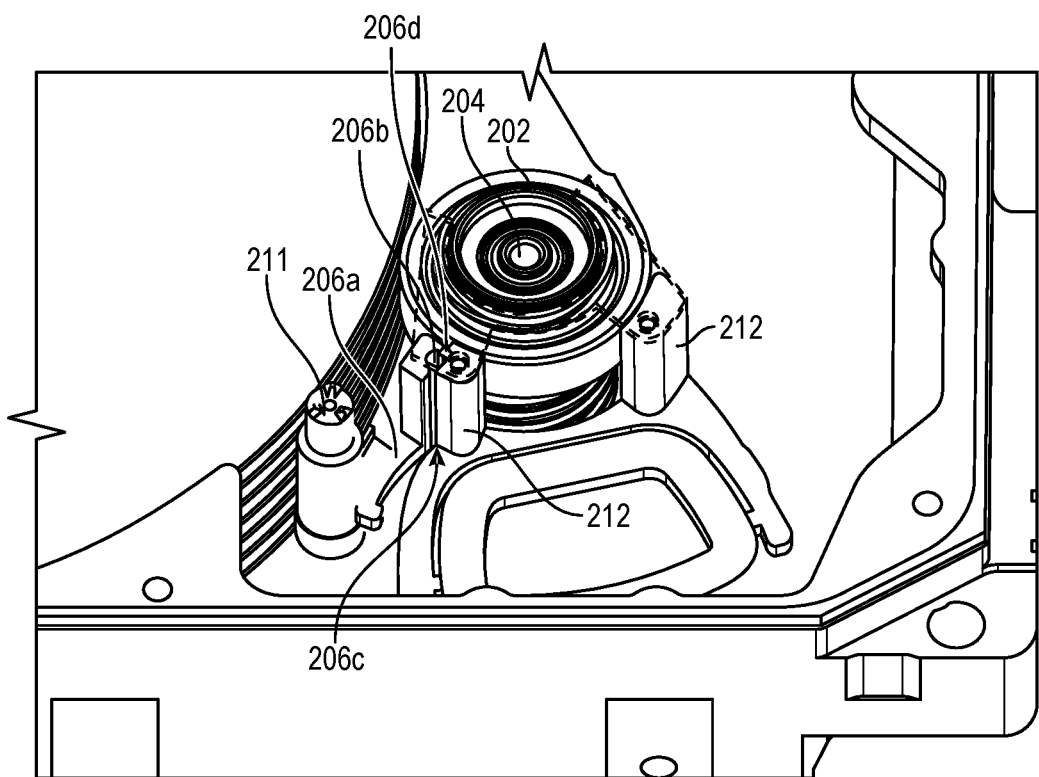
FIG. 5C is a perspective view illustrating the actuator-elevator assembly of FIG. 5A in a reduced-head data storage device, according to an embodiment.

FIG. 5A is a perspective view illustrating an actuator-elevator assembly, FIG. 5B is a plan view illustrating the actuator-elevator assembly of FIG. 5A, and FIG. 5C is a perspective view illustrating the actuator-elevator assembly of FIG. 5A in a reduced-head data storage device, all according to an embodiment. According to an embodiment and with reference to FIGS. 2A-4B, the locking/unlocking mechanism is constituent to the actuator subsystem (FIGS. 2A-2C) and which operates to vertically lock the actuator arm in place during seek/read/write operations, for example, and to unlock the actuator arm for vertical translation under the control of the cam 202 (FIGS. 4A-4B) and the stepper motor 204 (FIGS. 2A-3) constituent to the actuator elevator assembly 300 (FIG. 3).

FIGS. 5A-5C collectively illustrate a locking/unlocking mechanism previously-introduced as arm lock subsystem 206 (hereinafter, "locking mechanism 206"), located in the general area labeled as B-B in FIG. 5A. Locking mechanism 206 comprises a tab 206d extending from actuator arm 205 into a slot 206e within the structure of coil support assembly 212, whereby the tab 206d is squeezed, held, locked within the slot 206e when in a cam locked position and is released, unlocked from the compression of the slot 206e and therefore free to travel in the vertical direction when in a cam unlocked position. According to an embodiment, the tab 206d and/or the clamping surfaces of the slot 206e are coated with a low-wear, high-coefficient of friction material to provide for strong clamping while inhibiting the undesirable particle generation within the drive. Locking mechanism 206 further comprises a spring mechanism 206b disposed within a slit 206c within the coil support assembly 212, wherein the slit 206c intersects the slot 206e. According to an embodiment, the spring mechanism 206b is a sheet-like piece of material that is relatively thin, and long in the vertical direction in comparison with its width positioned coincident within the slit 206c. The spring mechanism 206b is rigid enough and configured/positioned within the slit 206c spanning across the slot 206e such that the force produced by the spring mechanism 206b, in a locked or default position (i.e., slightly bent along a vertical axis to elicit a spring-like force), compresses each side of the slot 206e toward each other to squeeze and hold the tab 206d in a fixed position within the slot 206e.

The cam is unlocked when the force associated with the spring mechanism 206b is overcome, thereby opening wider the slot 206e, such that the tab 206d is released from the hold of the slot 206e and thereby enabled to travel vertically within the slot 206e so that the actuator arm 205 from which the tab 206d extends can be vertically translated by the actuator elevator assembly 300. The force of spring mechanism 206b is overcome when a lock arm 206a, which is part of or constituent to the coil support assembly 212, and which is part of or extension of one side of the slot 206e, mechanically interacts with the previously-introduced ODCS 211, according to an embodiment. Alternatively, interaction with a mechanical element, feature, or structure other than a crash stop could be used to overcome the holding force of the spring mechanism 206b. As such, when the actuator arm 205 is driven/rotated far enough past the outer diameter of the disk stack, the lock arm 206a "crashes" into the ODCS 211, which causes the lock arm 206a to rotate (e.g., counterclockwise) which then functions to open the gap corresponding to slot 206e (e.g., similarly to how a clothes-pin functions).

Flexible Cable Assembly with Vertical Loop

Figure 6A:
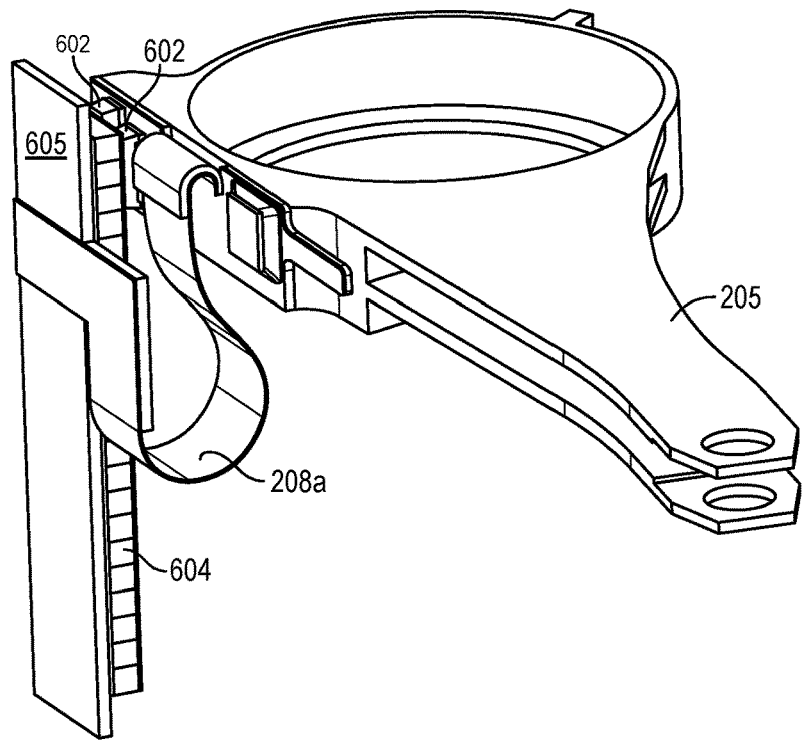
FIG. 6A is an isolated perspective view illustrating an actuator position sensor and flexible cable assembly, according to an embodiment.
Figure 6B:
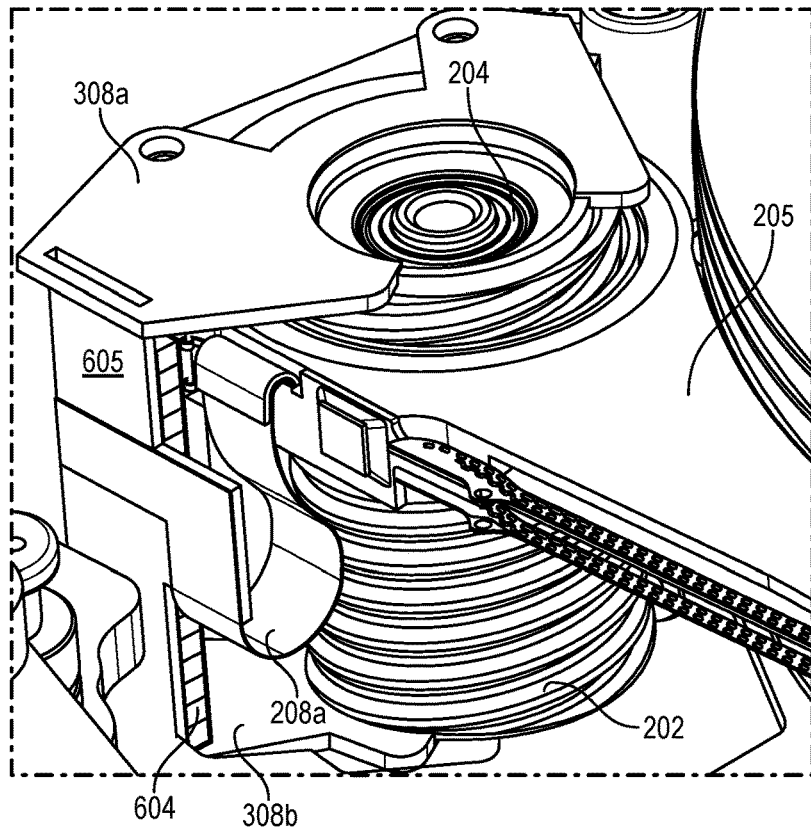
FIG. 6B is a perspective view illustrating the assembly of FIG. 6A assembled with the actuator elevator assembly of FIG. 3, according to an embodiment.

FIG. 6A is an isolated perspective view illustrating an actuator position sensor and flexible cable assembly, and FIG. 6B is a perspective view illustrating the assembly of FIG. 6A assembled with the actuator elevator assembly of FIG. 3, both according to an embodiment. According to an embodiment and with reference to FIGS. 2A-5C, the illustrated actuator position sensor and flexible cable assembly are constituent to the actuator subsystem (FIGS. 2A-2C), which provides for vertical translation of the actuator arm 205 under the control of the cam 202 (FIGS. 4A-4B) and the stepper motor 204 (FIGS. 2A-3) constituent to the actuator elevator assembly 300 (FIG. 3).

Conventional HDDs typically include a flexible cable assembly (FCA) such as FCA 156 of FIG. 1, which require some slack in the horizontal direction (e.g., XY direction) to allow for the distance between its connection points to vary in the horizontal direction in response to actuator rotation, as one connection point is with part of the actuator arm. However, an FCA cable for a rotating and vertically translating actuator connects to an actuator that not only moves in the XY plane for seeking data on the disk, but also moves in the Z direction to move among the disks in the multi-disk stack. Thus, a complete flex may be designed as either a one part solution or designed as two different parts combined together, with the use of a connector to carry electrical signals. With an actuator that is configured to move vertically, such as in the context of the actuator subsystem described in reference to of FIGS. 2A-5C, according to an embodiment the FCA 208 (see, e.g., FIGS. 2A-2C, not shown here), which moves in the XY direction such as during seeking, further comprises or is electronically coupled or spliced with a dynamic vertical loop portion of FCA, referred to as FCA vertical loop 208a, which moves effectively independently of the FCA 208 portion such as when the actuator is vertically translating. Functionally similar to the FCA 156, the FCA vertical loop 208a provides some slack in the Z direction to allow for the distance between its connection points to vary in the vertical direction in response to actuator vertical translation, as one connection point is with part of the actuator arm 205. Both the horizontal loop of FCA 208 and the FCA vertical loop 208a are configured to move independently of the other.

Note that the configuration and shape of the FCA vertical loop 208a may vary from implementation to implementation. According to an embodiment, a "U-loop" configuration is implemented for FCA vertical loop 208a (the loop generally resembles a letter "U" in various not-fully-extended states), as depicted in FIGS. 6A-6B. However, other shaped vertical loops may be designed and implemented for use in this context, such as a C-loop shape that resembles the letter "C" when not fully extended and an S-loop shape that resembles the letter "S" when not fully extended, and the like. In the configuration depicted, the FCA vertical loop 208a is positioned near a preamp 606 and whereby the XY loop of FCA 208 electrically connects the FCA vertical loop 208a to a bracket and/or a connector housing 210 (see, e.g., FIGS. 2A-2C).

Further illustrated in FIGS. 6A-6B is a pair of proximity or position sensors 602 coupled to the actuator arm 205 and configured to sense the Z position of the actuator arm 205 (e.g., vertical height) relative to a magnetic encoding strip and, ultimately, relative to the disk stack. According to an embodiment, one or more Hall effect sensors mounted in a quadrature configuration are implemented for the position sensor(s) 602, which function in coordination with a closely-positioned magnetic encoder strip 604, mounted on a stiffener 605, to provide sine and cosine signals for sensing the directions and crossing of the waveforms. The stiffener 605 may further function for positioning of the FCA 208 and FCA vertical loop 208a.

Generally, magnetic flux density in the air gap between the Hall sensors and the permanent magnet scale (i.e., magnetic encoding strip 604) should be set at an optimum gap range to provide adequate signal strength. A narrow gap causes signal saturation and a wide gap weakens the signal. In either case, detection of the zero-crossing points is uncertain. However, the quadrature configuration of the Hall sensors in conjunction with a 1 mm pole-pitch magnetic scale provides displacement and direction simultaneous by virtue of the leading and lagging nature of the waveforms in the upward and downward translations. For example, one Hall sensor signal leads when the stepper motor moves downward, and another Hall sensor signal leads when the stepper motor moves upward. A leading Hall sensor signal indicates the translational direction and the zero-crossing points of the sine-cosine waveforms provide the amount of the displacement.

Alternative Actuator Subsystem for Reduced-Head Hard Disk Drive

In the context of a cold storage HDD that includes a rotary cam (e.g., cam 202 of FIGS. 2A-5C) that is rotated with respect to an actuator coil assembly (e.g., VCM coil 209 of FIGS. 2B, 2C, 5A, 5B), which would vertically move a head-stack assembly (HSA) comprising one or more actuator arms (e.g., actuator arm 205 of FIGS. 2A-2C, 4A-4C, 5A, 5B) up and down from disk to disk, a means to provide that rotation is needed. According to an embodiment and with reference to FIG. 7 (and FIGS. 2A-2C), an axial flux permanent magnet (AFPM) motor 704 is assembled with the pivot assembly of the actuator subsystem (FIGS. 2A-2C, 7), which, in conjunction with a cam 702 similar to or the same as the cam 202 (FIGS. 4A-4B), forms an actuator elevator assembly similar to actuator elevator assembly 300 (FIG. 3), however with the AFPM motor 704 substituted for a claw-pole stepper motor embodying stepper motor 204.

In the context of a multi-disk HDD having an actuator elevator mechanism, the actuator subsystem design comprises a stationary shaft during the translation of the head stack assembly (HSA) to switch between magnetic recording disks. Furthermore, in the confined space of reduced-head hard disk drive rotary cam, it is preferable to implement a compact motor to rotate the cam in order to move the HSA bi-directionally in the vertical direction to access different disks in the stack. With this, a unique design of a motor is needed. Thus, an AFPM motor may be implemented alternatively to an in-pivot stepper motor, such as the claw pole stepper motor 204 (FIGS. 2A-3), to increase the torque within similar radial and axial space constraints and to decrease heat generation while increasing heat dissipation within a nearly enclosed space with very little air circulation and ventilation, for examples.

Figure 7:
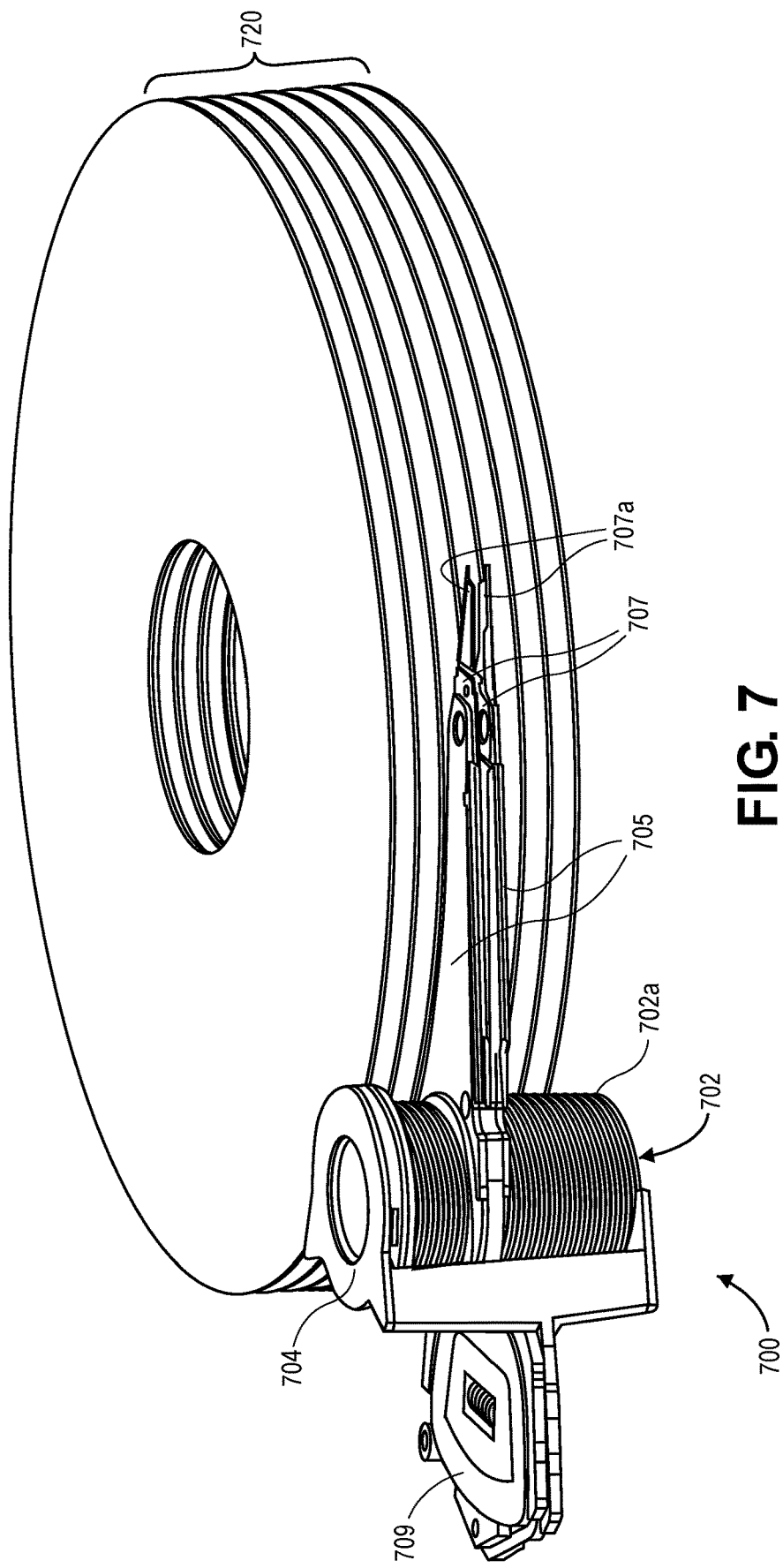
FIG. 7 is a perspective view illustrating an actuator subsystem in a reduced-head hard disk drive, according to an embodiment.

FIG. 7 is a perspective view illustrating an actuator subsystem in a reduced-head hard disk drive, according to an embodiment. Actuator subsystem 700 comprises a low profile ball screw cam assembly 702 (or "cam 702"), which transforms rotary motion into linear motion when driven by an axial flux permanent magnet (AFPM) motor 704 (or simply "AFPM motor 704") coupled with a screw 702*a* to form an actuator elevator subassembly, which is configured to vertically translate at least one actuator arm 705 (see, e.g., arm 132 of FIG. 1 and actuator arm 205 of FIGS. 2A-2C, 4A-4C, 5A, 5B) along with a respective HGA 707 (see, e.g., HGA 110 of FIG. 1). According to an embodiment, the actuator subsystem for a reduced-head HDD consists of two actuator arm 705 assemblies, as depicted, each with a corresponding HGA 707 (e.g., a modified head-stack assembly (HSA) in which the actuator arm assemblies translate vertically, or elevate, while the VCM coil 709 or voice coil motor assembly (VCMA), collectively, may be fixed in the vertical direction) housing a corresponding read-write head 707*a* (see, e.g., read-write head 110*a* of FIG. 1). Generally, the term "reduced-head HDD" is used to refer to an HDD in which the number of read-write heads is less than the number of magnetic-recording disk media 720 surfaces.

Actuator Elevator Assembly Having Axial Flux Permanent Magnet Motor

Figure 8:
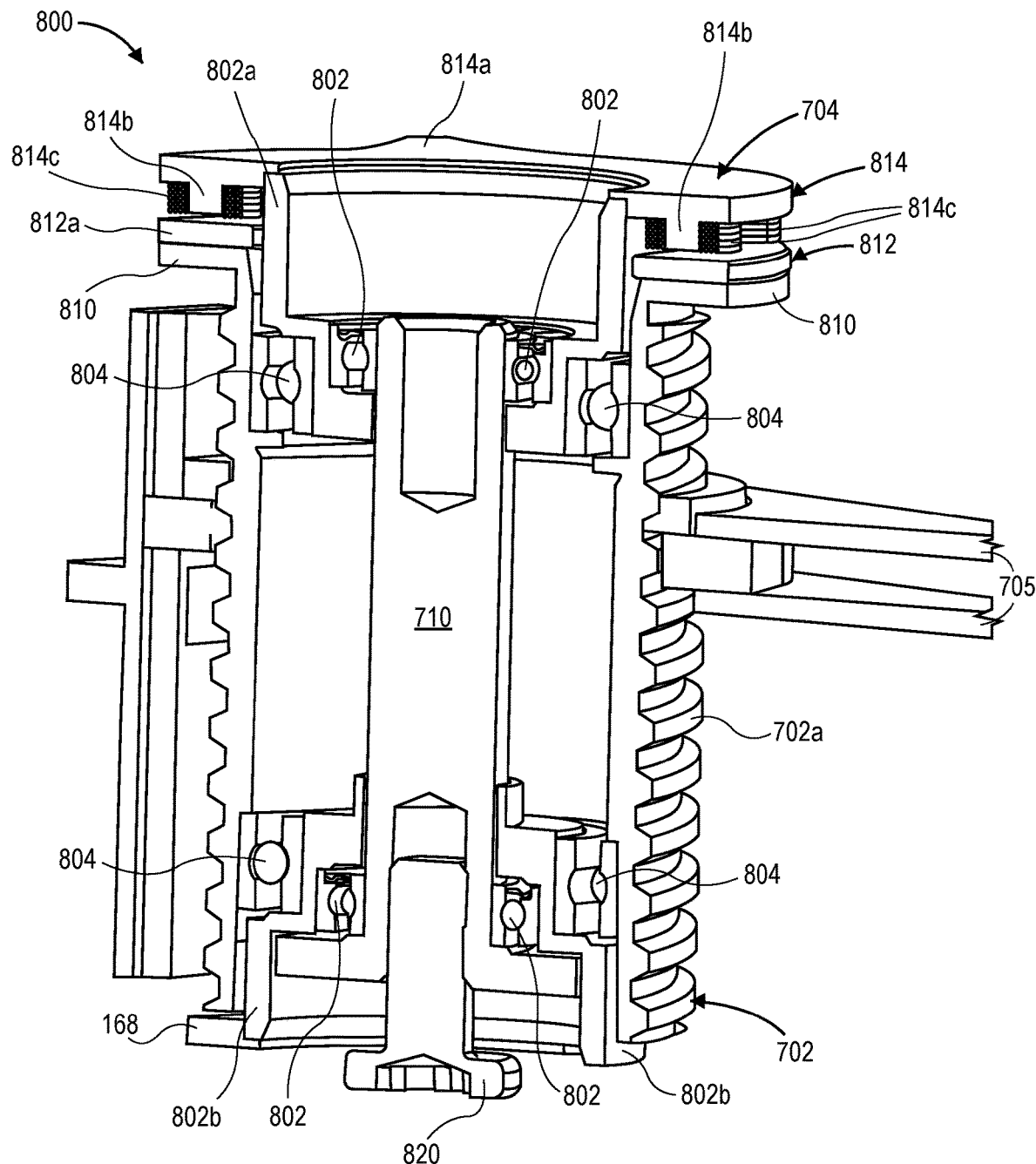
FIG. 8 is a cross-sectional side view illustrating an actuator elevator assembly including an "external" axial flux permanent magnet motor, according to an embodiment.

FIG. 8 is a cross-sectional side view illustrating an actuator elevator assembly including an "external" axial flux permanent magnet motor, according to an embodiment. This configuration of an actuator elevator assembly is referred to as "external" because the motor is external to the cam, generally, and the cam screw more particularly. The actuator elevator assembly 800 is configured for use in an actuator subsystem as illustrated and described in reference to FIG. 7 (as well as an actuator subsystem as illustrated and described in reference to FIGS. 2A-2C), i.e., configured to vertically translate at least one actuator arm 705 (see, e.g., a similar arm 205 of FIGS. 2A-2C, 4A-4C) with a respective HGA 707 (see, e.g., a similar HGA 207 FIGS. 2B, 2C) and a read-write head 707*a* (see, e.g., a similar read-write head 207*a* FIGS. 2B, 2C).

Actuator elevator assembly 800 comprises the actuator elevator subassembly comprising the ball screw cam 702 with the AFPM motor 704 affixed thereto, as described in more detail elsewhere herein, and collectively assembled around and configured to rotate about a pivot shaft 710. Here, the bottom of the pivot shaft 710 is shown positioned within a lower bearing assembly (e.g., HSA pivot bearing 802) and the top of the pivot shaft 710 top is shown positioned within an upper bearing assembly (e.g., HSA pivot bearing 802). In a typical HDD configuration, the inner pivot shaft 710 is further coupled to an HDD enclosure base (see, e.g., housing 168 of FIG. 1) via a screw 820 or other fastener and to an HDD cover via another screw or fastener (not shown here), effectively sandwiching the pivot shaft 710 and the actuator elevator assembly 800 within the corresponding HDD.

Actuator elevator assembly 800 further comprises a first set or pair of HSA pivot bearings 802 (e.g., one bearing assembly near the top and one bearing assembly near the bottom), along with upper inner bearing housing 802*a* and lower inner bearing housing 802*b*, where the upper inner bearing housing 802*a* is interposed at least in part between the pivot shaft 710 and the AFPM motor 704. HSA pivot bearings 802 function to support loads associated at least in part with the rotation of the actuator arms 705, along with the AFPM motor 704 and the cam 702 to which it is attached, about the stationary pivot shaft 710, such as during actuator seek, read, write, load, unload operations (a locked status). Actuator elevator assembly 800 further comprises a second set or pair of cam bearings 804 disposed within the cam 702 (e.g., one bearing assembly near the top and one bearing assembly near the bottom). Cam bearings 804 function to support loads associated at least in part with the rotation of the AFPM motor 704 and the cam 702 about the stationary pivot shaft 710, such as when the actuator elevator subassembly 800 is unlocked or decoupled from the HSA pivot bearings 802, such as during actuator vertical translation operations along the length of the cam screw 702*a*.

According to an embodiment, actuator elevator assembly 800 further comprises a third set of ball screw bearings, as illustrated and described in reference to FIGS. 4A-4C, comprising balls 202*c* and retainer 202*b* interposed between a cam screw 202*a* (or cam screw 702*a*) and the actuator arm 205 (or actuator arm 705). This ball screw bearing assembly functions to support loads associated at least in part with the rotation of the AFPM motor 704 and the cam 702 about the stationary pivot shaft 710 and the consequent actuator arm 205, 705 vertical translation operations.

According to an embodiment, the cam screw 702*a* of the actuator elevator assembly 800 further comprises an upper flange 810 to which an axially-magnetized permanent magnet (PM) 812*a* (e.g., composed of Nd—Fe—B) rotor 812 of the AFPM motor 704 is affixed. As depicted in FIG. 8, the upper flange 810 and the rotor 812 are both annular pieces, positioned around the outer diameter of the upper inner bearing housing 802*a* of upper HSA bearing assembly 802. Thus, the "back-iron" for the axial PM 812*a* ring is, as upper flange 810, an extension of the cam screw 702*a* and thereby reduces the need for additional vertical space. According to an embodiment, the cam screw 702*a* and the upper flange 810 thereof are constructed, composed, fabricated from a ferritic (e.g., magnetic) stainless steel such as DHS9 (a lead-free material), for strength, dimensional stability, and magnetic permeability.

According to an embodiment, the AFPM motor 704 of the actuator elevator assembly 800 further comprises a stator 814, comprising an integrated stator-top bracket assembly comprising a top bracket 814*a* of the actuator elevator assembly 800, where the bracket 814*a* comprises (i) a plurality of AFPM motor stator cores 814*b* (or "core protrusions 814*b*") extending therefrom, and (ii) a plurality of AFPM motor stator coils 814*c* each wound around a corresponding one of the core protrusions 814*b*. Thus, the AFPM motor stator 814 is fabricated as an integral part of the top bracket 814*a* of the actuator elevator assembly 800, thereby reducing the use of the premium vertical space associated with a low profile ball screw cam 702 of actuator subsystem 700 (FIG. 7). According to an embodiment, the top bracket 814*a* is constructed, composed, fabricated from a soft magnetic composite (SMC) material, which enables the molding of complex shapes in powder metal sintering process where a progressive-die stamping and forming processs may become impractical. Unlike the limitations of the electrical-steel laminations, the SMC enables the design of magnetic circuits in 3D flux paths to achieve complex and compact topology. According to an alternative embodiment, the top bracket 814*a* is constructed, composed, fabricated from a ferritic stainless steel such as DHS9.

Figure 9:
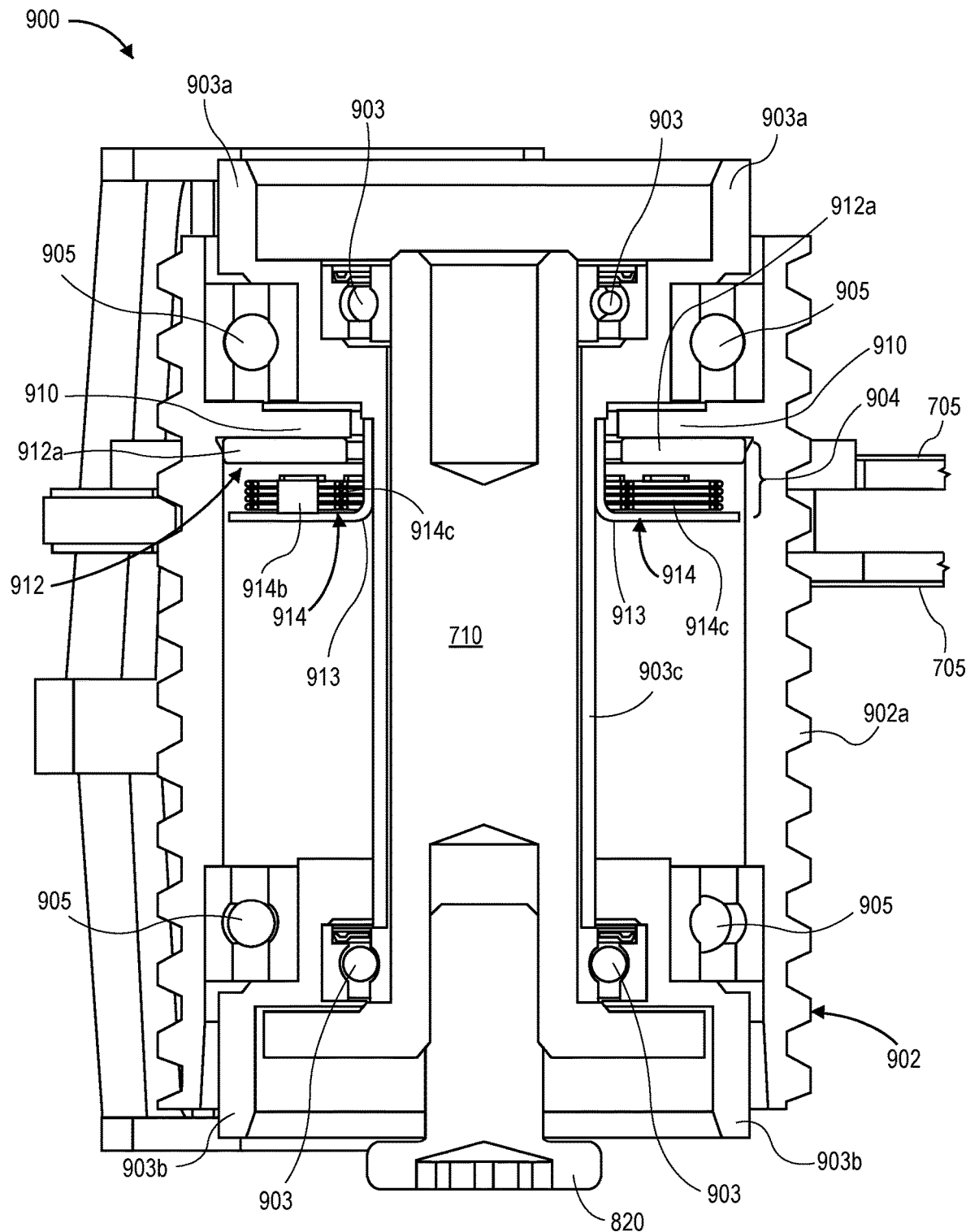
FIG. 9 is a cross-sectional side view illustrating a portion of an actuator elevator assembly including an "internal" axial flux permanent magnet motor, according to an embodiment.

FIG. 9 is a cross-sectional side view illustrating a portion of an actuator elevator mechanism including an "internal" axial flux permanent magnet motor, according to an embodiment. This configuration of an actuator elevator assembly is referred to as "internal" because the motor is positioned internally or disposed within the cam, generally, and the cam screw more particularly. The actuator elevator assembly 900 is configured for use in an actuator subsystem as illustrated and described in reference to FIG. 7 (as well as an actuator subsystem as illustrated and described in reference to FIGS. 2A-2C), i.e., configured to vertically translate at least one actuator arm 705 (see, e.g., a similar arm 205 of FIGS. 2A-2C, 4A-4C) with a respective HGA 707 (see, e.g., a similar HGA 207 FIGS. 2B, 2C) and read-write head 707a (see, e.g., a similar read-write head 207a FIGS. 2B, 2C).

Actuator elevator assembly 900 comprises an actuator elevator subassembly comprising a ball screw cam 902 (similar to but altered from the configuration of cam 702 of FIGS. 7-8) with an AFPM motor 904 affixed thereto, as described in more detail elsewhere herein, and collectively assembled around and configured to rotate about a pivot shaft 710. Here, the bottom of the pivot shaft 710 is shown positioned within a lower bearing assembly (e.g., HSA pivot bearing 903) and the top of the pivot shaft 710 top is shown positioned within an upper bearing assembly (e.g., HSA pivot bearing 903). In a typical HDD configuration, the inner pivot shaft 710 is further coupled to an HDD enclosure base (see, e.g., housing 168 of FIG. 1) via a screw 820 or other fastener and to an HDD cover via another screw or fastener (not shown here), effectively sandwiching the pivot shaft 710 and the actuator elevator assembly 900 within the corresponding HDD.

Actuator elevator assembly 900 further comprises a first set or pair of HSA pivot bearings 903 (e.g., one bearing assembly near the top and one bearing assembly near the bottom), along with upper inner bearing housing 903a and lower inner bearing housing 903b. HSA pivot bearings 903 function to support loads associated at least in part with the rotation of the actuator arms 705, along with the AFPM motor 904 and the cam 902 to which it is attached, about the stationary pivot shaft 710, such as during actuator seek, read, write, load, unload operations (a locked status). Actuator elevator assembly 900 further comprises a second set or pair of cam bearings 905 disposed within the cam 902 (e.g., one bearing assembly near the top and one bearing assembly near the bottom). Cam bearings 905 function to support loads associated at least in part with the rotation of the AFPM motor 904 and the cam 902 about the stationary pivot shaft 710, such as when the actuator elevator subassembly 900 is unlocked or decoupled from the HSA pivot bearing 903, such as during actuator vertical translation operations along the length of the cam screw 902a.

According to an embodiment, actuator elevator assembly 900 further comprises a third set of ball screw bearings, as illustrated and described in reference to FIGS. 4A-4C, comprising balls 202c and retainer 202b interposed between a cam screw 202a (or cam screw 902a) and the actuator arm 205 (or actuator arm 705). This ball screw bearing assembly functions to support loads associated at least in part with the rotation of the AFPM motor 904 and the cam 902 about the stationary pivot shaft 710 and the consequent actuator arm 205, 705 vertical translation operations.

According to an embodiment, the cam screw 902a of the cam 902 of the actuator elevator assembly 900 comprises an annular step structure 910 (or "step 910") extending radially inward from the inner diameter of the cam screw, and to which an annular axially-magnetized permanent magnet (PM) 912a (e.g., composed of Nd—Fe—B) rotor 912 is affixed (glued, for example). As depicted in FIG. 9, the rotor 912 is an annular piece, positioned around the shaft 710. According to an embodiment, the cam screw 902a is constructed, composed, fabricated from a ferritic stainless steel such as DHS9.

According to an embodiment, the AFPM motor 904 of the actuator elevator assembly 900 further comprises a stator 914, comprising a plurality of AFPM motor stator cores 914b (or "core protrusions 914b") and a plurality of AFPM motor stator coils 914c each wound around a corresponding one of the core protrusions 914b. According to an embodiment, actuator elevator assembly 900 further comprises a bearing sleeve or bearing housing 903c coupled with and extending from the upper inner bearing housing 903a of HSA pivot bearing 903 to or toward the lower inner bearing housing 903b of HSA pivot bearing 903. The stator 914 (including the core protrusions 914b and coils 914c) of the AFPM motor 904 is mounted or affixed to the outer diameter of the bearing housing 903c, such as glued to a stator support structure 913. Thus, with the AFPM motor 904 installed internally to the cam screw 902a of actuator elevator assembly 900, the vertical space associated with a low profile ball screw cam 702 of actuator subsystem 700 (FIG. 7) can be reduced even more significantly than with the external AFPM motor 804 of actuator elevator assembly 800 (FIG. 8).

Axial Flux Permanent Magnet (AFPM) Motor

An AFPM (axial flux permanent magnet) motor (also referred to as "pancake" motor) is a geometry of motor construction in which the gap between the rotor and stator, and therefore the direction of magnetic flux between the two, is aligned parallel with the axis of rotation rather than radially as with the concentric cylindrical geometry of the more common radial gap motor. Generally, an AFPM motor can provide greater electromagnetic torque relative to any conventional RFPM (Radial Flux Permanent Magnet) motor, for a given electromagnetic volume (e.g., considering the stack length of the stator and the mean diameter of the air gap).

Figure 10A:
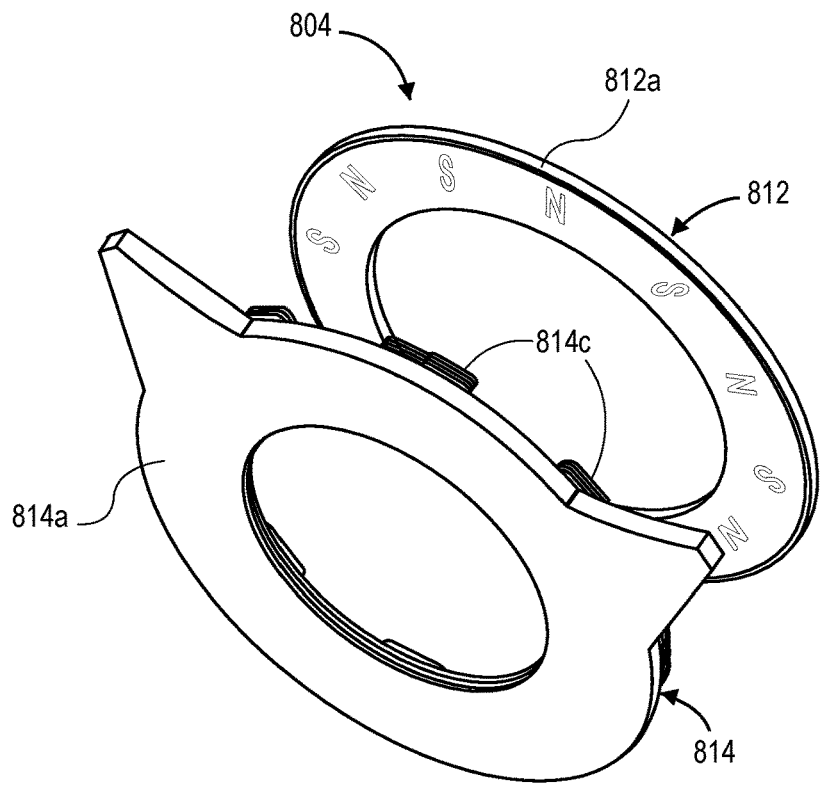
FIG. 10A is an exploded view of an axial flux permanent magnet motor, according to an embodiment.
Figure 10B:
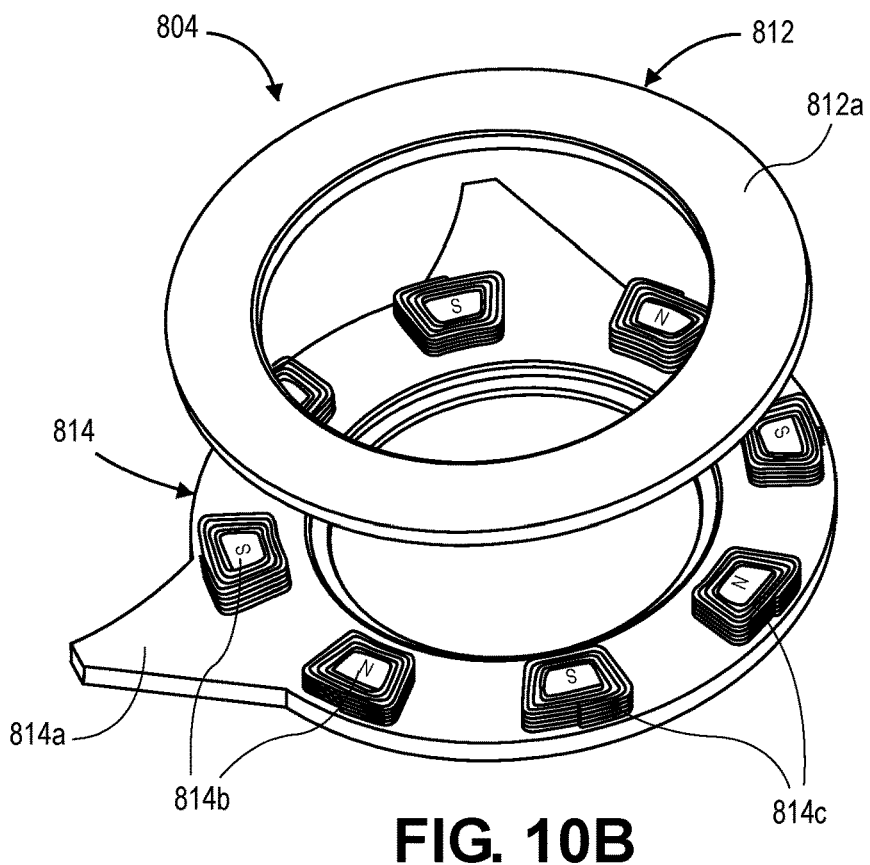
FIG. 10B is an exploded view of the axial flux permanent magnet motor of FIG. 9A, according to an embodiment.

FIG. 10A is an exploded view of an axial flux permanent magnet motor, and FIG. 10B is another exploded view of the axial flux permanent magnet motor of FIG. 10A, both according to an embodiment. The AFPM motor illustrated in FIGS. 10A-10B is an example implementation of the AFPM motor 804 of the actuator elevator assembly 800 of FIG. 8. As discussed, AFPM motor 804 comprises a rotor 812 comprising an axially-magnetized annular permanent magnet (PM) 812a (e.g., composed of Nd—Fe—B), which is configured for attachment to a mounting structure such as the upper flange 810 (FIG. 8) of the cam screw 702a (FIGS. 7-8). According to a particular but non-limiting embodiment, a compression-molded Nd—Fe—B PM 812a has a thickness of 0.6 mm and is magnetized axially to have either 12 poles (6 pole pairs) or 16 pole (8 pole pairs) to work with 9 stator salient poles or 12 stator salient poles, respectively. AFPM motor 804 further comprises a stator 814 which, according to an embodiment, comprises the integrated stator-top bracket assembly. As discussed, such an assembly comprises the top bracket 814a of the actuator elevator assembly 800 (FIG. 8), where the bracket 814a includes the plurality of AFPM motor stator core protrusions 814b (only some of which are labeled here, for drawing simplicity and clarity) extending therefrom, and the plurality of AFPM motor stator coils 814c (only some of which are labeled here, for drawing simplicity and clarity) each wound around a corresponding one of the core protrusions 814b. Thus, with this embodiment, the AFPM motor stator 814 is fabricated as an integral part of the top bracket 814a of the actuator elevator assembly 800. The number of turns and wire gage for the stator coils 814c can be designed and optimized for a specific electromangetic torque to meet the product minimum requirements according to the electric and magnetic loadings.

Method for Translating a Head-Stack Assembly to Access Multiple Disks

FIG. 11 is a flow diagram illustrating a method for vertically translating a head-stack assembly (HSA) in a hard disk drive (HDD) to access multiple magnetic-recording disks, according to an embodiment. FIG. 11 is described in further reference to components illustrated in FIGS. 7-10B and, as discussed elsewhere herein, AFPM motor 704, 904 may be assembled with and operate in conjunction with cam 702, 902, e.g., functionally similar to the cam 202 of FIGS. 2A-3 and structurally similar to the cam 202 and associated sub-components of FIGS. 4A-4C, and may be implemented in an assembly as depicted in FIGS. 5A-5C. That is, the AFPM motor 704, 904 may be implemented similarly to (e.g., substituted for functionally and operationally) the stepper motor 204 of FIG. 3 and the corresponding applications, implementations, and installations described in reference thereto.

At block 1102, an axial flux permanent magnet (AFPM) motor that is affixed to a screw of a ball screw cam assembly is driven, to rotate the screw about a coaxial (e.g., with the AFPM motor) shaft. For example, AFPM motor 704, 904 affixed to cam screw 702a, 902a of cam 702, 902 is driven, e.g., by applying electrical current to the AFPM motor 704, 904 thereby rotating the screw 702a, 902a of the cam 702, 902.

At block 1104, a planar multi-ball bearing assembly, which is coupled with a hard disk drive (HDD) head-stack assembly (HSA) is allowed to translate (e.g., vertically) in response to rotation of the screw. For example, driving the rotation of the screw 702a, 902a via the AFPM motor 704, 904 drives translation of an HSA comprising one or more actuator arms (e.g., actuator arm 205 of FIGS. 2A-2C, 4A-4C, 5A, 5B or actuator arm 705 of FIG. 7, coupled with the bearing balls 202c and retainer 202b of FIGS. 4A-4C) up and down from disk to disk along the length of screw 702a, 902a. Thus, the read-write head(s) of the HSA is enabled to access and perform read operations and write operations on each respective magnetic recording disk (e.g., disk medium 120 of FIG. 1 or disk medium 720 of FIG. 7) of a multi-disk stack of a reduced-head HDD.

According to an embodiment, translation of the HSA includes translating (e.g., vertically) a multi-ball bearing assembly coupled with the HSA, by each of a particular number of balls of the bearing assembly riding in a corresponding respective start of the same particular number of starts of the multi-start screw. For example, translation of the HSA includes translating (e.g., vertically) actuator arms 705 (e.g., similar to actuator arm 205 of FIG. 4A) coupled with the HSA, by each of a particular number of balls (e.g., similar to balls 202c of FIGS. 4A-4C) of the bearing assembly riding in a corresponding respective start or thread of the same particular number of starts of the multi-start screw 702a, 902a (e.g., similar to screw 202a of FIGS. 4A-4C). Thus, as described in reference to FIGS. 4A-4C, with the number of starts equaling the number of balls a stable planar "platform" is provided with a single bearing assembly perpendicular to the axis/translation path.

At block 1106, while the bearing assembly is translating, the vertical position of the HSA is sensed. For example, as illustrated in FIGS. 6A-6B a pair of proximity or position sensors 602 may be coupled to at least one actuator arm 205, 705 and configured to sense the Z position (e.g., vertical height) of the actuator arm 205, 705 relative to a magnetic encoding strip and, ultimately, relative to the disk stack.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. An actuator elevator assembly for a reduced-head hard disk drive (HDD), the assembly comprising:
   a ball screw cam assembly;
   a head-stack assembly (HSA) translatably coupled with the cam assembly; and
   an axial flux permanent magnet (AFPM) motor affixed to a screw of the cam assembly and configured to rotate about a fixed shaft around which the AFPM motor is positioned, to drive rotation of the screw to drive translation of the HSA along an axis of the screw.

2. The actuator elevator assembly of claim 1, wherein the screw of the cam assembly comprises an upper flange to which an axial permanent magnet rotor of the AFPM motor is affixed.

3. The actuator elevator assembly of claim 2, wherein the screw and the upper flange are composed of a ferritic stainless steel material.

4. The actuator elevator assembly of claim 2, further comprising:
   an integrated stator-top bracket assembly comprising:
      a top actuator elevator assembly bracket comprising a plurality of AFPM motor stator core protrusions extending therefrom, and
      a plurality of AFPM motor stator coils each wound around a corresponding stator core protrusion of the plurality of stator core protrusions.

5. The actuator elevator assembly of claim 4, wherein the top actuator elevator assembly bracket is composed of a soft magnetic composite (SMC) material.

6. The actuator elevator assembly of claim 4, wherein the top actuator elevator assembly bracket is composed of a ferritic stainless steel material.

7. A hard disk drive comprising the actuator elevator assembly of claim 4.

8. The actuator elevator assembly of claim 1, further comprising:
an integrated stator-top bracket assembly comprising:
a top actuator elevator assembly bracket comprising a plurality of AFPM motor stator core protrusions extending therefrom, and
a plurality of AFPM motor stator coils each wound around a corresponding stator core protrusion of the plurality of stator core protrusions.

9. The actuator elevator assembly of claim 8, further comprising:
a lower inner bearing assembly;
an upper inner bearing assembly; and
a bearing housing coupled with and extending from the upper inner bearing assembly to the lower inner bearing assembly;
wherein an AFPM motor stator comprising a plurality of AFPM motor stator coils each wound around a corresponding stator core protrusion is mounted to an outer diameter of the bearing housing.

10. A hard disk drive comprising the actuator elevator assembly of claim 9.

11. The actuator elevator assembly of claim 9, wherein the screw of the cam assembly comprises an annular step structure extending radially inward from an inner diameter of the screw and to which an axial permanent magnet rotor of the AFPM motor is affixed.

12. The actuator elevator assembly of claim 11, wherein the screw of the cam assembly is composed of a ferritic stainless steel material.

13. A hard disk drive comprising the actuator elevator assembly of claim 1.

14. The actuator elevator assembly of claim 1, wherein the ball screw cam assembly comprises:
a hollow screw comprising at least three starts,
a ball bearing assembly comprising a same number of balls as starts, wherein each ball rides in a corresponding start, thereby forming a plane on which the balls ride perpendicular to the axis of the screw.

15. The actuator elevator assembly of claim 1, further comprising:
one or more proximity sensors coupled with the HSA; and
a magnetic encoder strip positioned in close proximity to the one or more proximity sensors, and configured to provide a magnetic field for sensing by the one or more proximity sensors.

16. A method for vertically translating a head-stack assembly (HSA) in a hard disk drive (HDD) to access multiple magnetic-recording disks, the method comprising:
driving an axial flux permanent magnet (AFPM) motor affixed to a screw of a ball screw cam assembly, thereby rotating the screw about a coaxial fixed shaft;
allowing a planar multi-ball bearing assembly that is coupled with the HSA to translate vertically in response to rotating the screw; and
while the bearing assembly is translating, sensing the vertical position of the HSA.

17. The method of claim 16, wherein the AFPM motor is affixed to the screw by:
an upper flange, of the screw, to which an axial permanent magnet rotor of the AFPM motor is affixed; and
an integrated stator-top bracket assembly over the rotor and comprising:
a top actuator elevator assembly bracket comprising a plurality of AFPM motor stator core protrusions extending therefrom, and
a plurality of AFPM motor stator coils each wound around a corresponding stator core protrusion of the plurality of stator core protrusions.

18. The method of claim 16, wherein the AFPM motor is affixed to the screw by:
an annular step structure, extending radially inward from an inner diameter of the screw, to which an axial permanent magnet rotor of the AFPM motor is affixed; and
a bearing housing coupled with and extending between a lower bearing assembly and an upper bearing assembly of the ball screw cam assembly, an outer diameter of the bearing housing to which an AFPM motor stator comprising a plurality of AFPM motor stator coils each wound around a corresponding stator core protrusion is mounted.

19. A reduced-head hard disk drive (HDD), comprising:
recording means for storing digital information;
reading/writing means for reading from and writing to the recording means;
means for moving the reading/writing means to access portions of the recording means;
axial flux permanent magnet (AFPM) motor rotating means for rotating cam means about a fixed shaft for translating the reading/writing means from one recording means to another recording means; and
means for sensing a vertical position of the reading/writing means.

\* \* \* \* \*